(12) United States Patent
Ha et al.

(10) Patent No.: US 10,673,285 B2
(45) Date of Patent: Jun. 2, 2020

(54) ELECTRONIC DEVICE AND METHOD FOR CONTROLLING WIRELESS TRANSMIT POWER BY DETECTING FOREIGN OBJECT

(71) Applicant: Samsung Electronics Co., Ltd., Suwon-si, Gyeonggi-do (KR)

(72) Inventors: Mincheol Ha, Suwon-si (KR); Changhak O, Suwon-si (KR); Kwangseob Kim, Suwon-si (KR); Dongzo Kim, Suwon-si (KR); Jiwon Kim, Suwon-si (KR); Jongchul Hong, Seongnam-si (KR); Kihyun Kim, Suwon-si (KR); Yunjeong Noh, Suwon-si (KR); Jaewan Park, Suwon-si (KR); Hyungkoo Chung, Suwon-si (KR); Jihye Kim, Suwon-si (KR); Keumsu Song, Suwon-si (KR); Yongsang Yun, Suwon-si (KR); Sangmoo Hwangbo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/283,182

(22) Filed: Feb. 22, 2019

(65) Prior Publication Data

US 2019/0267849 A1    Aug. 29, 2019

(51) Int. Cl.
*H02J 50/60* (2016.01)
*H02J 50/80* (2016.01)
(Continued)

(52) U.S. Cl.
CPC .............. *H02J 50/60* (2016.02); *H02J 7/025* (2013.01); *H02J 50/12* (2016.02); *H02J 50/80* (2016.02); *H02J 7/00045* (2020.01)

(58) Field of Classification Search
CPC .. H02J 50/60; H02J 50/80; H02J 50/12; H02J 7/025; H02J 2007/0001
(Continued)

(56) References Cited

U.S. PATENT DOCUMENTS

2009/0127936 A1   5/2009  Kamijo et al.
2013/0257168 A1   10/2013 Singh
(Continued)

FOREIGN PATENT DOCUMENTS

EP    3322068 A1      5/2018
JP    2009-124889 A   6/2009
(Continued)

OTHER PUBLICATIONS

Partial European Search Report dated Oct. 8, 2019 in connection with European Patent Application No. 19 15 8817, 9 pages.
(Continued)

*Primary Examiner* — Carlos Amaya

(57) ABSTRACT

Various embodiments related to electronic devices are set forth herein. According to an embodiment, an electronic device comprises a coil, a power transmitting circuit electrically connected with the coil, a sensing circuit, and a control circuit. The control circuit is configured to wirelessly output, using the power transmitting circuit, a first designated power through the coil to an external electronic device, and identify, using the sensing circuit, first energy detected at the coil due to a foreign object of the electronic device. The control circuit is further configured to, when a magnitude of the energy falls within a first designated range, output, using the power transmitting circuit, a second designated power to the external electronic device, and when the magnitude of the energy falls within a second designated range, abstain from outputting the power to the external (Continued)

electronic device using the power transmitting circuit. Other embodiments are possible as well.

19 Claims, 12 Drawing Sheets

(51) Int. Cl.
  *H02J 50/12* (2016.01)
  *H02J 7/02* (2016.01)
  *H02J 7/00* (2006.01)
(58) Field of Classification Search
  USPC .......................................................... 307/104
  See application file for complete search history.

(56) References Cited

U.S. PATENT DOCUMENTS

| | | | |
|---|---|---|---|
| 2015/0115728 A1 | 4/2015 | Yamamoto et al. | |
| 2016/0204642 A1 | 7/2016 | Oh et al. | |
| 2016/0352155 A1 | 12/2016 | Iwasaki | |
| 2017/0040843 A1* | 2/2017 | Asanuma | H02J 7/025 |
| 2017/0047769 A1 | 2/2017 | Kim et al. | |
| 2017/0331334 A1 | 11/2017 | Park | |
| 2018/0006505 A1 | 1/2018 | Nakano et al. | |
| 2018/0331575 A1* | 11/2018 | Ikefuji | H02J 7/00 |

FOREIGN PATENT DOCUMENTS

| | | | | |
|---|---|---|---|---|
| JP | 2015-111996 A | | 6/2015 | |
| JP | 2015-165761 A | | 9/2015 | |
| JP | 2017-028984 A | | 2/2017 | |
| JP | 2017038509 A | * | 2/2017 | ............. H02J 7/025 |
| JP | 2017-209011 A | | 11/2017 | |
| KR | 10-2015-0019227 A | | 2/2015 | |
| KR | 20160023964 A | * | 3/2016 | ............. H02J 17/00 |
| KR | 10-2016-0061121 A | | 5/2016 | |
| KR | 10-2017-0020147 A | | 2/2017 | |
| KR | 10-2017-0118571 A | | 10/2017 | |
| WO | WO-201081975 A1 | * | 5/2017 | ............. H02J 50/12 |

OTHER PUBLICATIONS

Decision of Grant in connection with Korean Application No. 10-2018-0021907 dated Feb. 12, 2020, 8 pages.

* cited by examiner

ELECTRONIC DEVICE AND METHOD FOR CONTROLLING WIRELESS TRANSMIT POWER BY DETECTING FOREIGN OBJECT

CROSS-REFERENCE TO RELATED APPLICATION

This application is based on and claims priority under 35 § 119 to Korean Patent Application No. 10-2018-0021907, filed on Feb. 23, 2018, in the Korean Intellectual Property Office, the disclosure of which is incorporated by reference herein in its entirety.

BACKGROUND

1. Field

Various embodiments of the disclosure relate to electronic devices and methods for wirelessly transmitting power.

2. Description of Related Art

Wireless or contactless charging techniques have been developed and are widely used for various electronic devices. Wireless charging technology takes advantage of wireless power transmission/reception and may be technology for wirelessly transferring power from a power transmitter to a power receiver without any separate connection via charging connections between the power transmitter and the power receiver, thus charging the battery of the power receiver.

Wireless charging technology is used for charging various portable electronic devices, such as smartphones, wireless electric toothbrushes, or wireless electric shavers, and its ability to wirelessly charge electronics may rid the user of the need for a charger, thus allowing electronic devices to be more portable, with the outlook of making its relevant techniques available for electric vehicles or other bulky electronic equipment that require battery charging. Wireless charging may be implemented in various types, including, but not limited to, the use of electromagnetic induction, resonance, and radio frequency (RF)/microwave radiation.

Wireless charging enables power transmission/reception between a wireless power transmitter an electronic device) and a wireless power receiver (e.g., an external electronic device) without relying on a physical connection. Thus, the presence of a foreign or external object (e.g., a metallic object) between the wireless power transmitter and the wireless power receiver while wireless charging is performed may degrade the power transmission/reception efficiency and add heat due to induction heating.

A wireless charging technique may detect external objects that may reside between the wireless power transmitter and the wireless power receiver, and upon detecting one, may stop the wireless power transmitter from sending the transmit power—that is, so-called foreign object detection (FOD) can be carried out.

Conventional methods of FOD may determine that there is a foreign object even thought that is not the case, e.g., when misalignment occurs between the wireless power transmitter and the wireless power receiver, and as such, their detection accuracy is low.

The above information is presented as background information only to assist with an understanding of the disclosure. No determination has been made, and no assertion is made, as to whether any of the above might be applicable as prior art with regard to the disclosure.

SUMMARY

According to an embodiment, there may be provided an electronic device that may raise the accuracy of MD upon wireless charging and a method for controlling wireless transmit power by detecting a foreign object on such an electronic device.

According to an embodiment, a foreign object may be detected in a signal transmission/reception state for wireless charging, e.g., one among a ping phase, an identification/configuration state, and a power transfer phase, so that wireless transmit power may be controlled by detecting a foreign object before power is actually transmitted to an external electronic device.

According to an embodiment, the sensitivity of FOD may be adjusted by determining a threshold for stopping power transmission to an external electronic device based on the energy caused by a foreign object before power is actually transmitted to the external electronic device.

According to an embodiment, an electronic device may comprise a coil, a power transmitting circuit electrically connected with the coil, a sensing circuit, and a control circuit, wherein the control circuit may be configured to wirelessly output first designated power through the coil to an external electronic device using the power transmitting circuit, to identify first energy from the first designated power detected at the coil due to a foreign object by using the sensing circuit, when the magnitude of the first energy falls within a first designated range, to output second designated power to the external electronic device using the power transmitting circuit, and when the magnitude of the first energy falls within a second designated range, to abstain from (or stopping, restricting, or suppressing) outputting the power to the external electronic device using the power transmitting circuit.

According to an embodiment, an electronic device may comprise a coil, a power transmitting circuit electrically connected with the coil, a sensing circuit, and a control circuit, wherein the control circuit may be configured to wirelessly output first designated power and second designated power through the coil to an external electronic device using the power transmitting circuit, to identify the state of the first designated power and the state of the second designated power detected at the coil or the power transmitting circuit resulting from a foreign object by using the sensing circuit, to detect the foreign object positioned adjacent to the electronic device based on the identified state of the first designated power and the identified state of the second designated power, and to adjust (or control) the power output to the external electronic device based on at least the detection of the foreign object.

According to an embodiment, a method for controlling wireless transmit power by detecting a foreign object by an electronic device may comprise wirelessly outputting first designated power and second designated power through a coil to an external electronic device using a power transmitting circuit, identifying a variation in the magnitude of the first designated power and a variation in the magnitude of the second designated power detected at the coil or the power transmitting circuit due to the foreign object by using a sensing circuit, detecting the foreign object positioned adjacent to the electronic device based on at least one of the identified variation in the magnitude of the first designated power or the identified variation in the magnitude of the second designated power, and adjusting (or controlling) the power output to the external electronic device based on at least the detection of the foreign object.

According to an embodiment, an electronic device may comprise a coil, a power transmitting circuit electrically connected with the coil, a sensing circuit, and a control circuit, wherein the control circuit may be configured to output a signal to wirelessly provide power through the coil to an external electronic device using the power transmitting circuit, to identify power detected at the coil while outputting the signal by using the sensing circuit, to determine a detection threshold for detecting a foreign object based on the magnitude of the detected power, and to stop providing power to the external electronic device upon detecting the foreign object based on the determined detection threshold when wirelessly providing power through the coil to the external electronic device.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

FIGS. 1 through 11c, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
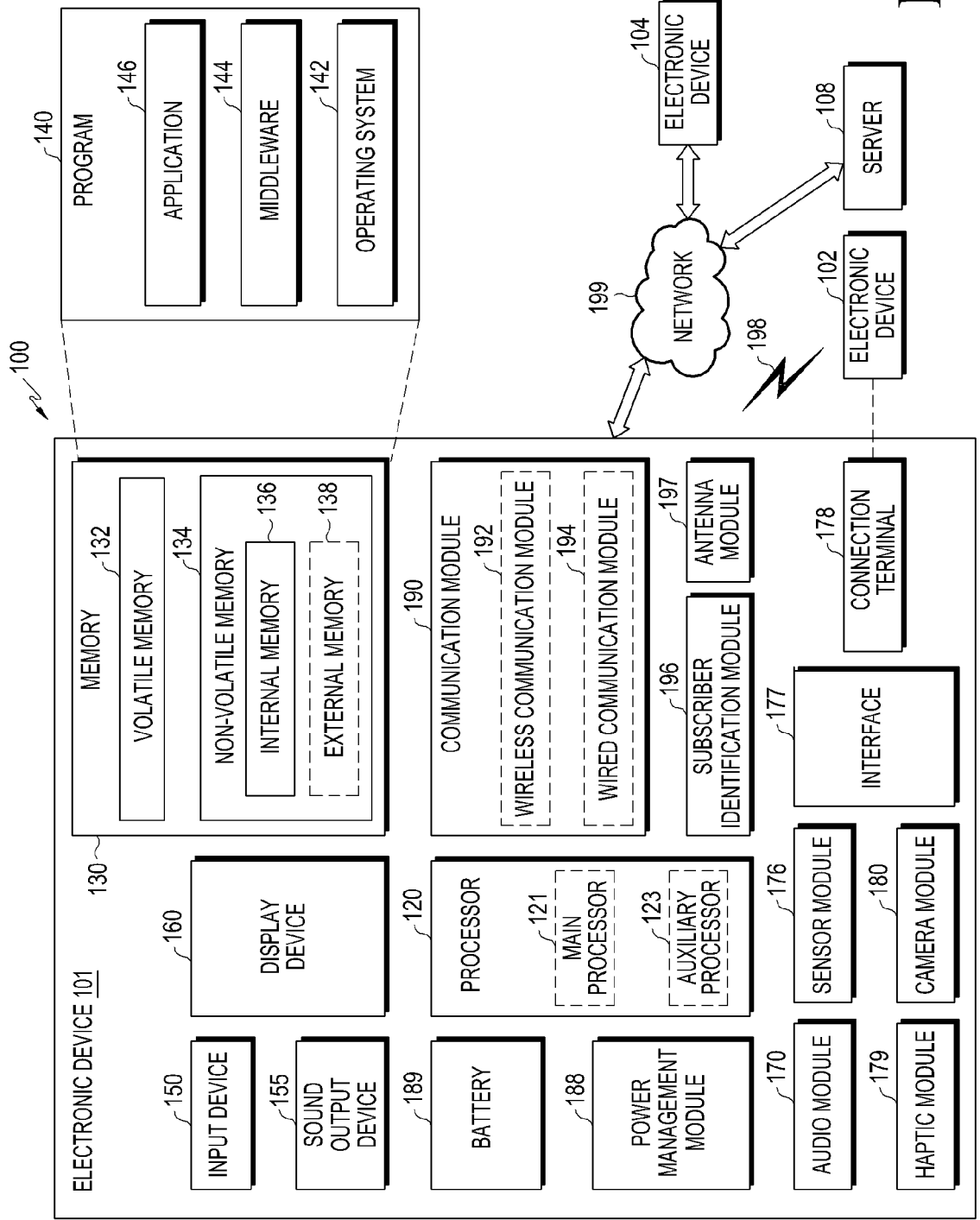
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (WI-FI) direct, or infrared data association (IRDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
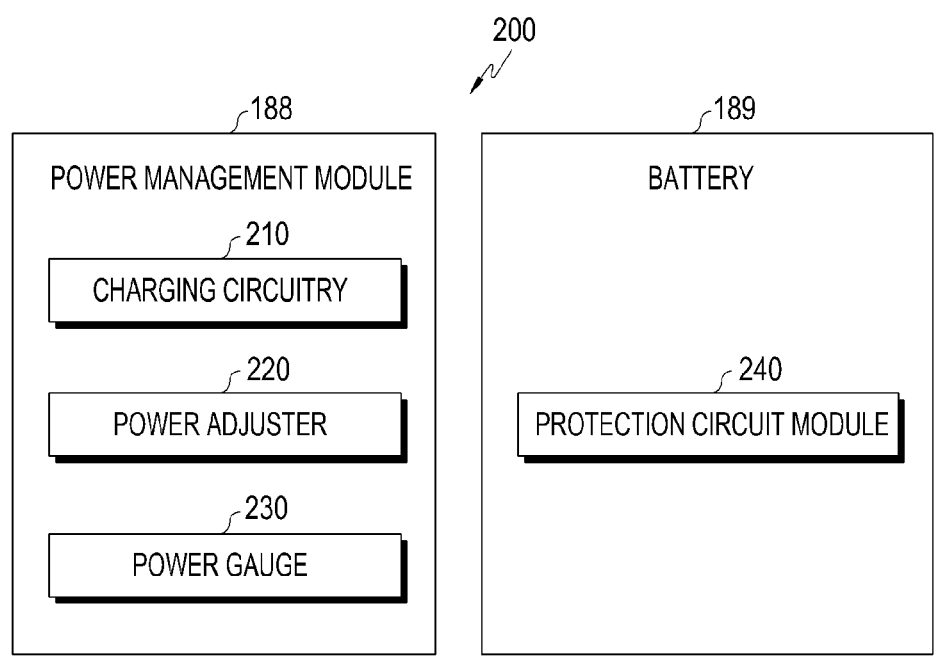
FIG. 2 is a block diagram illustrating a power management module and a battery according to an embodiment.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., GOOGLE PLAY STORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
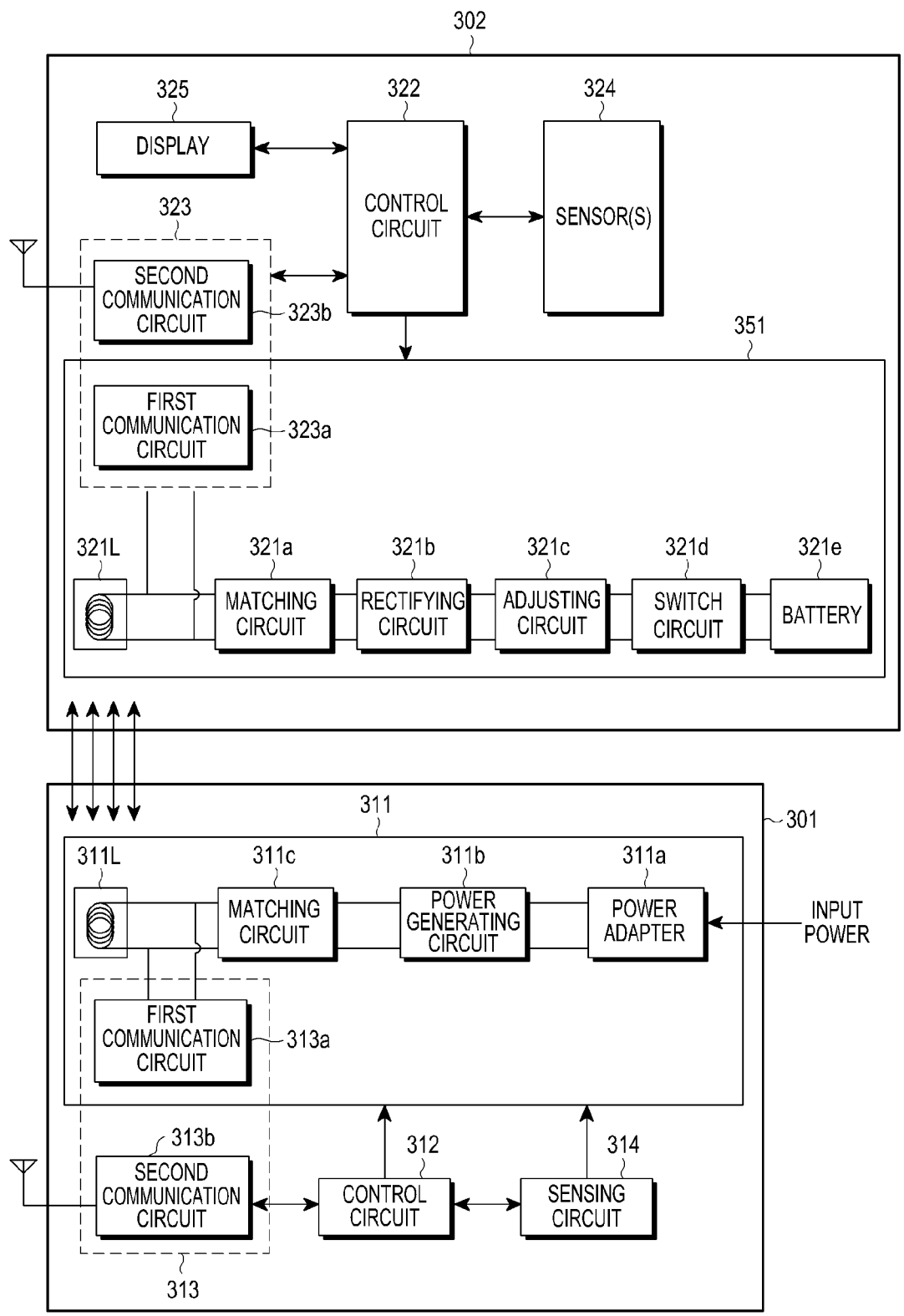
FIG. 3 is a view illustrating a wireless charging environment according to an embodiment.

FIG. 3 is a view illustrating a wireless charging environment according to an embodiment.

Referring to FIG. 3, according to an embodiment, an electronic device 301 (e.g., 102 of FIG. 1) (hereinafter, also referred to as a 'power transmitter') may wirelessly supply power to an external electronic device 302 (e.g., 101 of FIG. 1) (hereinafter, also referred to as a 'power receiver'), and the external electronic device 302 may wirelessly receive power.

According to an embodiment, the power transmitter 301 may include a power transmitting circuit 311, a control circuit 312, a communication circuit 313, and/or a sensing circuit 314.

According to an embodiment, the power transmitting circuit 311 may include a power adapter 311a to receive power from the outside and to properly convert the received power, a power generating circuit 311b to generate power, and/or a matching circuit 311*c* to maximize the efficiency between a transmitting coil 311L and a receiving coil 321L.

According to an embodiment, the control circuit 312 may provide overall control of the power transmitter 301, generate various messages used for wireless power transmission and transfer the messages to the communication circuit 313. According to an embodiment, the control circuit 312 may calculate power (or its amount) to be transmitted to the power receiver 302 based on information received from the communication circuit 313. According to an embodiment, the control circuit 312 may control the power transmitting circuit 311 to transmit the calculated power to the power receiver 302 via the transmitting coil 311L.

According to an embodiment, the control circuit 312 may be configured to wirelessly output first designated power and second designated power to the power receiver 302 via the transmitting coil 311L using the power transmitting circuit 311. For example, the first designated power may be output in a first mode, and the second designated power may be output in a second mode. For example, the first mode may be a mode (e.g., the identification/configuration phase) in which the power transmitter 301 performs communication for authenticating the power receiver 302, which is the target for wireless charging, and the second mode may be a mode (e.g., the power transfer phase) in which the power transmitter 301 provides power to the power receiver 302.

According to an embodiment, the first mode and the second mode may be a mode to perform communication for authenticating the power receiver 302 which is the target for wireless charging, a mode in which the power transmitter 301 provides power to the power receiver 302, and any other various modes. According to an embodiment, the first designated power may be first power that is output by the power transmitter 301 at a first designated time while the power transmitter 301 and the power receiver 302 perform the wireless charging process, and the second designated power may be second power that is output by the power transmitter 301 at a second designated time while the power transmitter 301 and the power receiver 302 perform the wireless charging process. For example, the first designated power may be power that is transmitted at a first energy measurement time detected at the transmitting coil 311L due to a foreign object, and the second designated power may be power at a second energy measurement time detected at the transmitting coil 311L due to a foreign object. The first designated power may be the same or different from the second designated power. The first designated power and the second designated power may be output in the second mode.

According to an embodiment, the control circuit 312 may wirelessly output the first designated power to the power receiver 302 via the transmitting coil 311L using the power transmitting circuit 311, identify energy detected at the transmitting coil 311L due to a foreign object of the power transmitter 301 of the first designated power, when the magnitude of the identified energy falls within a first designated range, output the second designated power to the power receiver 302 using the power transmitting circuit 311, and when the magnitude of the energy falls within a second designated range, stop outputting power to the power receiver 302 using the power transmitting circuit 311.

According to an embodiment, the energy detected at the transmitting coil 311L due to the foreign object may be at least one of thermal energy or electrical energy.

According to an embodiment, the first designated range may be a range in which a detected thermal energy value is equal to or smaller than a designated thermal energy threshold, and the second designated range may be a range in which the detected thermal energy value is larger than the designated thermal energy threshold.

According to an embodiment, the first designated range may be a range in which a detected electrical energy value is equal to or smaller than a designated electrical energy threshold, and the second designated range may be a range in which the detected electrical energy value is larger than the designated electrical energy threshold. For example, the electrical energy may be at least one of current, voltage, or power.

According to an embodiment, the control circuit 312 may be configured to wirelessly output the first designated power and the second designated power to the power receiver 302 via the transmitting coil 311L using the power transmitting circuit 311, to identify the state of the first designated power and the state of the second designated power detected at the transmitting coil 311L or the power transmitting circuit 311 resulting from a foreign object using the sensing circuit 314, to detect the foreign object positioned adjacent to the power transmitting circuit 311 based on the identified state of the first designated power and the identified state of the second designated power, and to adjust power output to the power receiver 302 based on at least detecting the foreign object.

As used herein, 'power' may mean current or voltage.

According to an embodiment, the control circuit 312 may identify the state of the first designated power while a signal is output in the first mode (e.g., the identification/configuration phase) to perform communication for authenticating the power receiver 302, which is the target for wireless charging, and the state of the second designated power while a signal is output in the second mode (e.g., the power transfer phase) in order to provide power to the power receiver 302.

According to an embodiment, the foreign object may be a metallic material. The state values of the first designated power and the second designated power may be the magnitudes of the first power and second power identified by, e.g., sensing, or variations of the magnitudes of the first designated power and second designated power made due to the foreign object.

According to an embodiment, the magnitudes of the first designated power and the second designated power may be a magnitude of power set to be output by the power transmitter 301.

According to an embodiment, the power transmitter 301 may output the first designated power and the second designated power at a first time and a second time, respectively. The magnitudes of the first designated power and the second designated power may be varied (e.g., increased) when a foreign object (e.g., a metallic material) is present between the power transmitter 301 and the power receiver 302. The control circuit 312 may identify the magnitude of the first designated power output in the first mode and the magnitude of the second designated power output in the second mode using the sensing circuit 314, detect the foreign object based on the magnitude of the first designated power and the magnitude of the second designated power, and adjust power output to the power receiver 302 according to the detection of the foreign object.

According to an embodiment, the control circuit 312 may determine the state of the detected foreign object, e.g., the distance between the power transmitter 301 and the foreign object, or the size or shape of the foreign object, based on the magnitudes of the first power and second power measured using the sensing circuit 314, and may adjust power output to the power receiver 302 according to the state of the foreign object. According to an embodiment, when at least one of the magnitude of the first power or the magnitude of the second power falls within a third designated range that is smaller in value than the first designated range, the control circuit 312 may be configured to detect the foreign object based on a first detection threshold related to detecting a metallic material.

According to an embodiment, when at least one of the magnitude of the first power or the magnitude of the second power measured using the sensing circuit 314 falls within a first designated range, the control circuit 312 may be configured to adjust a first detection threshold related to detecting the metallic material to a second detection threshold smaller than the first detection threshold and to detect the foreign object based on the adjusted second detection threshold.

According to an embodiment, when at least one of the magnitude of the first power or the magnitude of the second power measured using the sensing circuit 314 falls within a second designated range larger in value than the first designated range, the control circuit 312 may be configured to stop outputting power to the external electronic device.

According to an embodiment, the control circuit 312 may be configured to output a signal for wirelessly providing power through the transmitting coil 311L to the power receiver 302 using the power transmitting circuit 311, identify power detected at the transmitting coil 311L while outputting the signal, determine a detection threshold for detecting the foreign object based on the identified power, and detect the foreign object based on the determined detection threshold upon wirelessly providing the power through the transmitting coil 311L to the power receiver 302.

According to an embodiment, the control circuit 312 may be configured to stop providing power to the power receiver 302 upon detecting the foreign object. According to an embodiment, when the difference in magnitude between the power of the signal provided to the power receiver 302 and the power received by the power receiver 302 exceeds the determined detection threshold, the control circuit 312 may be configured to determine that the foreign object is present and to stop providing power to the power receiver 302.

According to an embodiment, the control circuit 312 may transmit or receive at least one signal (in at least one of, e.g., a ping phase, an identification/configuration phase, or a power transfer phase). For example, the signal may be a signal strength packet (SSP) signal received from the external electronic device (e.g., the electronic device 101 of FIG. 1 or the power receiver 302 of FIG. 3) in the identification/configuration phase or a control error packet (CEP) signal received from the external electronic device (e.g., the electronic device 101 of FIG. 1 or the power receiver 302 of FIG. 3) in the power transfer phase. According to an embodiment, the control circuit 312 may receive at least one signal containing data, and after receiving the data, may measure a state magnitude of the power through the sensing circuit 314.

According to an embodiment, when the magnitude of power detected while outputting a signal to wirelessly provide power to the power receiver 302 falls within a first designated power range, the control circuit 312 may be configured to determine that a threshold for detecting a foreign object is a first detection threshold, when the magnitude of energy detected while outputting at least one signal falls within a second designated power range larger than the first designated power range, the control circuit 312 may be configured to determine that the threshold for determining a foreign object is a second detection threshold smaller than the first detection threshold, and when the magnitude of power detected while outputting at least one signal falls within a third designated power range larger than the second designated power range, the control circuit 312 may be configured to stop providing power to the power receiver 302.

According to an embodiment, the communication circuit 313 may include at least one of a first communication circuit 313a and a second communication circuit 313b. The first communication circuit 313a may communicate with a first communication circuit 323a of the power receiver 302 using the same frequency as the frequency used for power transfer via, e.g., the transmitting coil 311L (e.g., an inband scheme). According to an embodiment, the second communication circuit 313b may communicate with a second communication circuit 323b of the power receiver 302 using a frequency different from the frequency used for power transfer via, e.g., the transmitting coil 311L (e.g., an outband scheme). For example, the second communication circuit 313b may obtain information (e.g., Vrec information, Iout information, various packets, or messages) related to the charging state from the second communication circuit 323b by using any one of various short-range communication schemes, such as BLUETOOTH, BLUETOOTH low energy (BLE), wireless-fidelity (WI-FI), or near-field communication (NFC).

According to an embodiment, the sensing circuit 314 may include at least one or more sensors and may detect at least one state of the power transmitter 301 using at least one or more sensors.

According to an embodiment, the sensing circuit 314 may include at least one of a temperature sensor, a motion sensor, or a current (or voltage) sensor. The sensing circuit 314 may detect the temperature state of the power transmitter 301 using the temperature sensor, the motion state of the power transmitter 301 using the motion sensor, and the state, e.g., current, voltage, or power magnitude, of a signal output from the power transmitter 301 using the current (or voltage) sensor.

According to an embodiment, the current (or voltage) sensor may measure signals at the power transmitting circuit 311. For example, the current (or voltage) sensor may measure signals at, at least, part of the transmitting coil 311L, the matching circuit 311c, or the power generating circuit 311b. For example, the current (voltage) sensor may include a circuit for measuring signals at the front end of the transmitting coil 311L.

According to an embodiment, the sensing circuit 314 may be a circuit for foreign object detection (FOD).

According to an embodiment, the power receiver 302 may include a power receiving circuit 351, a control circuit 322, a communication circuit 323, at least one sensor 324, and/or a display 325. Components of the power receiver 302 which correspond to those of the power transmitter 301 may partially be excluded from the description.

According to an embodiment, the power receiving circuit 351 may include a receiving coil 321L for wirelessly receiving power from the power transmitter 301, a matching circuit 321a, a rectifying circuit 321b rectifying received alternating current (AC) power into direct current (DC) power, an adjusting circuit 321c adjusting charged voltage, a switch circuit 321d, and/or a battery 321e.

According to an embodiment, the control circuit 322 may provide overall control the power receiver 302, generate various messages used for wireless power transmission and transfer the messages to the communication circuit 323.

According to an embodiment, the communication circuit 323 may include at least one of a first communication circuit 323a and a second communication circuit 323b. The first communication circuit 323a may communicate with the power transmitter 301 via the receiving coil 321L. The second communication circuit 323b may communicate with the power transmitter 301 using any one of various short-range communication schemes, such as BLUETOOTH, BLE, WI-FI, or NFC.

According to an embodiment, the power receiver 302 may further include at least one sensor 324, such as a current/voltage sensor, a temperature sensor, an illuminance sensor, or a sound sensor, and a display 325.

According to an embodiment, an electronic device (e.g., the electronic device 102 of FIG. 1 or the power transmitter 301 of FIG. 3) may comprise a coil (e.g., the transmitting coil 311L of FIG. 3), a power transmitting circuit (e.g., the power transmitting circuit 311 of FIG. 3) electrically connected with the coil, a sensing circuit (e.g., the sensing circuit 314 of FIG. 3), and a control circuit (e.g., the control circuit 312 of FIG. 3), wherein the control circuit may be configured to wirelessly output first designated power through the coil to an external electronic device (e.g., the electronic device 101 of FIG. 1 or the external electronic device 302 of FIG. 3) using the power transmitting circuit, to identify first energy from the first designated power detected at the coil due to a foreign object of the electronic device by using the sensing circuit, when the magnitude of the first energy falls within a first designated range, to output second designated power to the external electronic device by using the power transmitting circuit, and when the magnitude of the first energy falls within a second designated range, to abstain from (or restraining, stopping, restricting, or suppressing) outputting power to the external electronic device by using the power transmitting circuit.

According to an embodiment, the control circuit may be configured to output third designated power through the coil to the external electronic device by using the power transmitting circuit before outputting the first designated power.

According to an embodiment, the control circuit may be configured to output the third designated power of the same magnitude of as that the first designated power.

According to an embodiment, the control circuit may be configured to identify second energy from the third designated power detected at the coil by using the sensing circuit.

According to an embodiment, the foreign object may include a metallic material. When the magnitude of at least one of the energy or the second energy falls within a third designated range in which the maximum value is smaller than the minimum value of the first designated range, the control circuit may be configured to output the second designated power while maintaining a first detection threshold related to detecting the metallic material.

According to an embodiment, the foreign object may include a metallic material. When the magnitude of the first energy and the second energy falls within the first designated range, the control circuit may be configured to adjust a first detection threshold related to detecting the metallic material to a second detection threshold smaller than the first detection threshold and output the second designated power according to the adjusted second detection threshold.

According to an embodiment, when the magnitude of the first energy and the magnitude of the second energy fall within the second designated range, the control circuit may be configured to stop outputting power to the external electronic device.

According to an embodiment, an electronic device (e.g., the electronic device 102 of FIG. 1 or the power transmitter 301 of FIG. 3) may comprise a coil (e.g., the transmitting coil 311L of FIG. 3), a power transmitting circuit (e.g., the power transmitting circuit 311 of FIG. 3) electrically connected with the coil, a sensing circuit (e.g., the sensing circuit 314 of FIG. 3), and a control circuit (e.g., the control circuit 312 of FIG. 3), wherein the control circuit may be configured to wirelessly output first designated power and second designated power through the coil to an external electronic device (e.g., the electronic device 101 of FIG. 1 or the power receiver 302 of FIG. 3) by using the power transmitting circuit, to identify a state of the first designated power and a state of the second designated power detected at the coil or the power transmitting circuit resulting from a foreign object by using the sensing circuit, to detect the foreign object positioned adjacent to the electronic device based on the identified state of the first designated power and the identified state of the second designated power, and to adjust the power output to the external electronic device based on at least the detection of the foreign object.

According to an embodiment, the control circuit may be configured to output the first designated power in a first mode for performing communication for authenticating the external electronic device and the second designated power in a second mode for providing power to the external electronic device.

According to an embodiment, the foreign object may include a metallic material. When at least one of the state of the first designated power or the state of the second designated power falls within a third designated range in which the maximum value is smaller than the minimum value of a first designated range, the control circuit may be configured to detect the foreign object based on a first detection threshold related to detecting the metallic material.

According to an embodiment, the foreign object may include a metallic material. When at least one of the magnitude of the first power or the magnitude of the second power measured using the sensing circuit 314 falls within a first designated range, the control circuit may be configured to adjust a first detection threshold related to detecting the metallic material to a second detection threshold smaller than the first detection threshold and to detect the foreign object based on the adjusted second detection threshold.

According to an embodiment, when at least one of the magnitude of first power or the magnitude of second power falls within a second designated range in which the minimum value is larger than the maximum value of the first designated range, the control circuit may be configured to stop outputting power to the external electronic device.

According to an embodiment, an electronic device (e.g., the electronic device 102 of FIG. 1 or the power transmitter 301 of FIG. 3) may comprise a coil (e.g., the transmitting coil 311L of FIG. 3), a power transmitting circuit (e.g., the power transmitting circuit 311 of FIG. 3) electrically connected with the coil, a sensing circuit (e.g., the sensing circuit 314 of FIG. 3), and a control circuit (e.g., the control circuit 312 of FIG. 3), wherein the control circuit may be configured to output a signal to wirelessly provide power through the coil to an external electronic device by using the power transmitting circuit, to identify power detected at the coil while outputting the signal by using the sensing circuit, to determine a detection threshold for detecting a foreign object based on the magnitude of the detected power, and to stop providing power to the external electronic device upon detecting the foreign object based on the determined detection threshold when wirelessly providing power through the coil to the external electronic device.

According to an embodiment, when the difference in magnitude between power of the signal provided to the external electronic device and power received by the external electronic device exceeds the determined detection threshold, the control circuit may be configured to determine that the foreign object is detected.

According to an embodiment, the power may include at least one of first power identified in a first mode for performing communication for authenticating the external electronic device which is a target for wireless charging or second power identified in a second mode for providing power to the external electronic device.

According to an embodiment, the control circuit may be configured to determine that the threshold for detecting the foreign object is a first detection threshold when the detected magnitude of power falls within a first designated power range and that the threshold for detecting the foreign object is a second detection threshold smaller than the first detection threshold when the magnitude of power falls within a second designated power range in which the minimum value is larger than the maximum value of the first designated power range, and to stop providing power to the external electronic device when the magnitude of power falls within a third designated power range in which the minimum value is larger than the maximum value of the second designated power range.

According to an embodiment, the electronic device (e.g., the electronic device 102 of FIG. 1 or the power transmitter 301 of FIG. 3) may receive at least one of a first signal that is received in a first mode for performing communication for authenticating an external electronic device (e.g., the electronic device 101 of FIG. 1 or the power receiver 302 of FIG. 3) which is a target for wireless charging and a second signal in a second mode for providing power to the external electronic device. The control circuit 312 may receive at least one signal and may measure the state of power through the sensing circuit 314 after receiving the at least one signal.

For example, after receiving the first signal in the first mode, the control circuit 312 may measure the magnitude of the first power through the sensing circuit 314, and after receiving the second signal in the second mode, the control circuit 312 may measure the magnitude of the second power through the sensing circuit 314.

Figure 4:
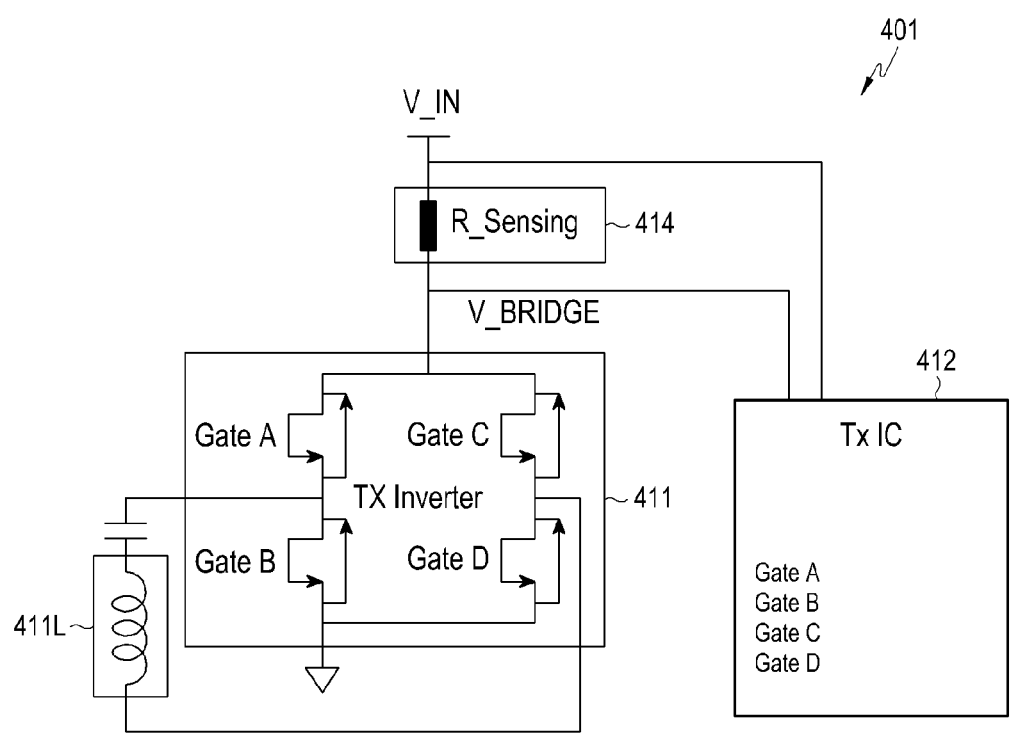
FIG. 4 is a view illustrating an example of a sensing circuit in a power transmitter according to an embodiment.

FIG. 4 is a view illustrating an example of a sensing circuit in a power transmitter according to an embodiment.

Referring to FIG. 4, according to an embodiment, a sensing circuit 401 (e.g., the sensing circuit 314 of FIG. 3) may include a current (or voltage) sensor 414. The current (or voltage) sensor 414 may measure current or voltage at the front end of a power transmitting circuit 411 (e.g., the power transmitting circuit 311 of FIG. 3) and provide the measured value to a control circuit 412 (e.g., the control circuit 312 of FIG. 3). Alternatively, the current (or voltage) sensor 414 may measure current or voltage at the front end of a transmitting coil 411L (e.g., the transmitting coil 311L of FIG. 3) and provide the measured value to the control circuit 412.

Figure 5A:
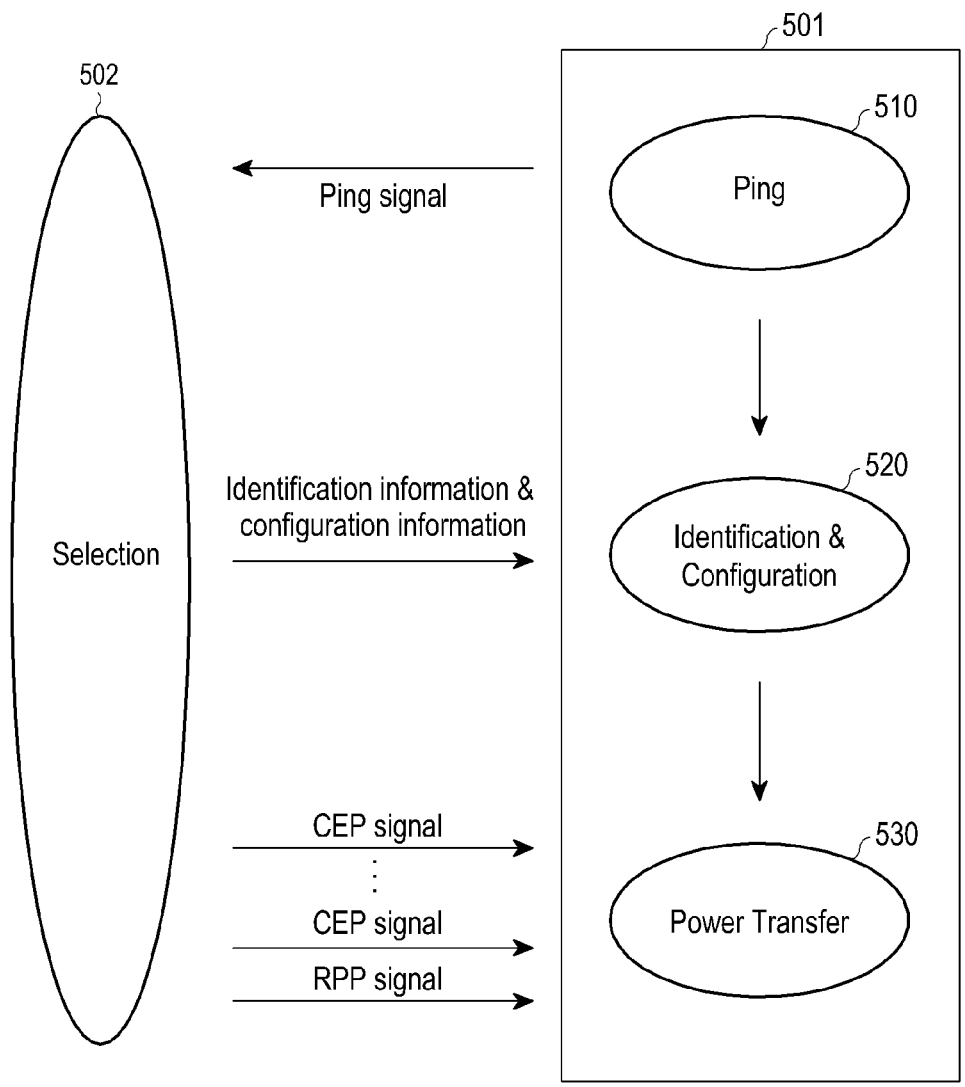
FIGS. 5A and 5B are views illustrating power transmission modes upon wireless charging according to an embodiment.
Figure 5B:
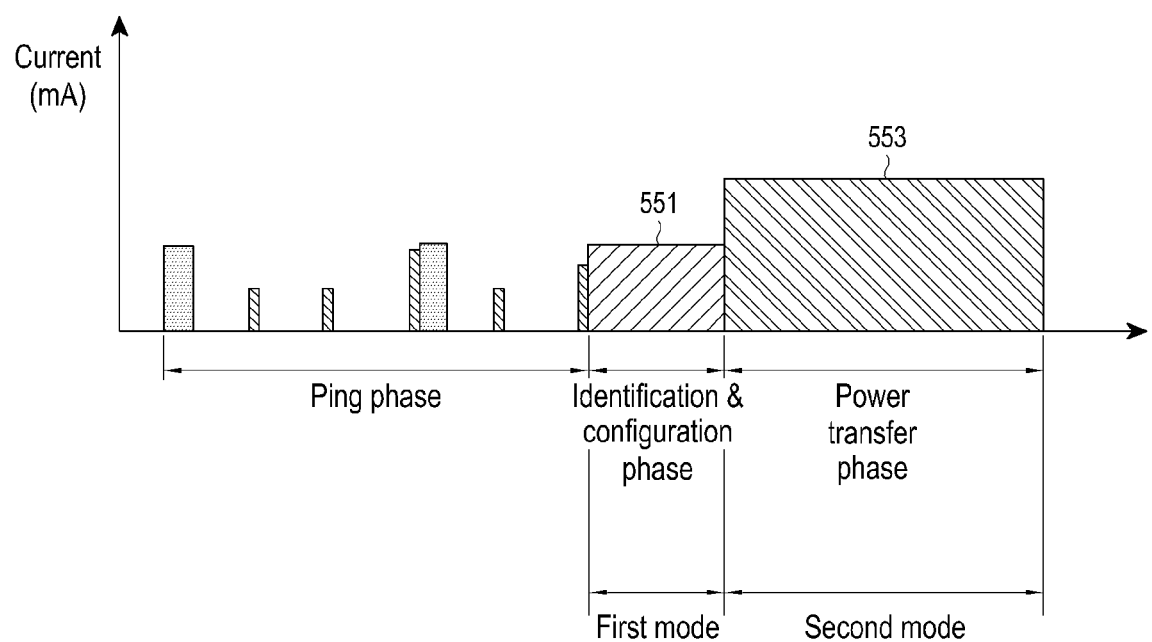

FIGS. 5A and 5B are views illustrating power transmission modes upon wireless charging according to an embodiment.

Referring to FIG. 5A, according to an embodiment, a power transmitter 501 (e.g., the electronic device 102 of FIG. 1 or the power transmitter 301 of FIG. 3) may detect and authenticate a power receiver ('selection') 502 (e.g., the electronic device 101 of FIG. 1 or the power receiver 302 of FIG. 3) and may transmit/receive at least one signal corresponding to a ping phase 510, an identification/configuration phase 520, and/or a power transfer phase 530 to provide power to the power receiver 502.

The power transmitter 501 may transmit a ping signal, e.g., a digital ping signal or an analog ping signal in the ping phase 510. As the power receiver 502 receives the ping signal from the power transmitter 501, the power transmitter 501 may detect the power receiver 502.

By detecting the power receiver 502, the power transmitter 501 may receive identification information and configuration information for authenticating the power receiver from the power receiver 502. The identification information may contain information for identifying the power receiver 502, and the configuration information may contain various pieces of information used by the power receiver 502 to receive power.

The power transmitter 501 may authenticate the power receiver 502 based on the identification information and the configuration information from the power receiver 502, and upon successful authentication, may receive at least one or more control error packet (CEP) signals or at least one or more received error packet (RPP) signals from the power receiver 502 in the power transfer phase 530. The RPP signal may contain information indicating the magnitude of receive power received by the power receiver 502. The power transmitter 501 may adjust the power output to the power receiver 502 based on the CEP signal and the RPP signal.

Referring to FIG. 5B, according to an embodiment, the power transmitter 501 (e.g., the electronic device 102 of FIG. 1 or the power transmitter 301 of FIG. 3) may wirelessly output designated power (or designated current or voltage) through a transmitting coil (e.g., the transmitting coil 311L of FIG. 3 or the transmitting coil 411L of FIG. 4) upon outputting signals in at least one of the ping phase 510, the identification/configuration phase 520, and/or the power transfer phase 530.

According to an embodiment, the power transmitter 501 may output first designated power using a first charging current 551 in a first mode including the identification/configuration phase 520 for authenticating the power receiver 502 and second designated power using a second charging current 553 in a second mode including the power transfer phase 530.

According to an embodiment, the power transmitter 501 may detect a foreign object between the power transmitter 501 and the power receiver 502 according to energy detected at the transmitting coil (e.g., the transmitting coil 311L of FIG. 3 or the transmitting coil 411L of FIG. 4) of the first designated power and may output the second designated power to the power receiver 502 or stop outputting power to the power receiver 502 depending on whether a foreign object is detected.

Figure 6:
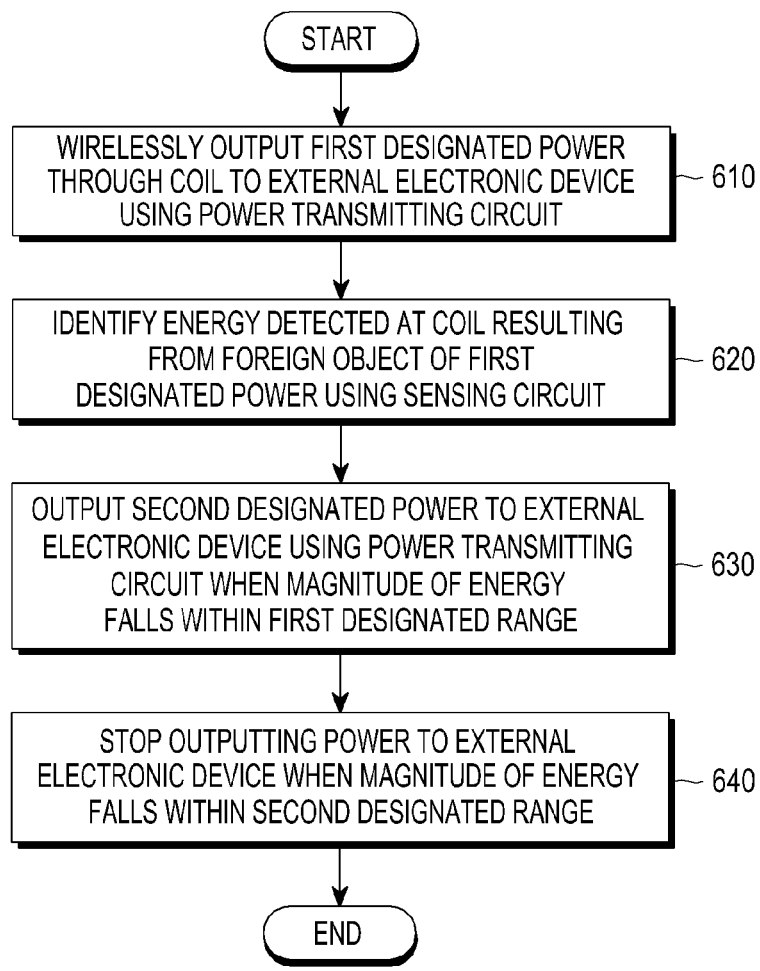
FIG. 6 is a view illustrating an operation in which a power transmitter stops power transmission to a power receiver based on energy caused by a foreign object according to an embodiment.

FIG. 6 is a view illustrating an operation in which a power transmitter stops power transmission to a power receiver based on energy caused by a foreign object according to an embodiment.

Referring to FIG. 6, according to an embodiment, in operation 610, a control circuit (e.g., the control circuit 312 of FIG. 3 or the control circuit 412 of FIG. 4) of an electronic device (e.g., the electronic device 102 of FIG. 1, the power transmitter 301 of FIG. 3, or the power transmitter 501 of FIG. 5A) may wirelessly output first designated power to an external electronic device (e.g., the electronic device 101 of FIG. 1, the power receiver 302 of FIG. 3, or the power receiver 502 of FIG. 5A) through a transmitting coil (e.g., the transmitting coil 311L of FIG. 3 or the transmitting coil 411L of FIG. 4) using a power transmitting circuit (e.g., the power transmitting circuit 311 of FIG. 3 or the power transmitting circuit 411 of FIG. 4).

According to an embodiment, the electronic device (e.g., the electronic device 102 of FIG. 1, the power transmitter 301 of FIG. 3, or the power transmitter 501 of FIG. 5A) may output first designated power in a first mode (e.g., the identification/configuration phase) for authenticating the external electronic device (e.g., the electronic device 101 of FIG. 1, the power receiver 302 of FIG. 3, or the power receiver 502 of FIG. 5A) and second designated power in a second mode (e.g., the power transfer phase) for transmitting power to the power receiver (e.g., the electronic device 101 of FIG. 1, the power transmitter 301 of FIG. 3, or the power transmitter 501 of FIG. 5A).

In operation 620, the control circuit (e.g., the processor 120 of FIG. 1, the control circuit 312 of FIG. 3, or the control circuit 412 of FIG. 4) may identify energy detected at the transmitting coil (e.g., the transmitting coil 311L of FIG. 3 or the transmitting coil 411L of FIG. 4) due to a foreign object of the power transmitter 501 of the first designated power using a sensing circuit (e.g., the sensing circuit 314 of FIG. 3 or the current (or voltage) sensor 414 of FIG. 4). According to an embodiment, the control circuit (e.g., the control circuit 312 of FIG. 3 or the control circuit 412 of FIG. 4) may detect thermal energy generated by the foreign object through the transmitting coil (e.g., the transmitting coil 311L of FIG. 3 or the transmitting coil 411L of FIG. 4) of the first designated power by using the sensing circuit (e.g., the sensing circuit 314 of FIG. 3 or the current (or voltage) sensor 414 of FIG. 4) and may identify the detected thermal energy. The control circuit (e.g., the control circuit 312 of FIG. 3 or the control circuit 412 of FIG. 4) may detect electrical energy (current, voltage, or power) generated by the foreign object through the transmitting coil (e.g., the transmitting coil 311L of FIG. 3 or the transmitting coil 411L of FIG. 4) of the first designated power by using the sensing circuit (e.g., the sensing circuit 314 of FIG. 3 or the current (or voltage) sensor 414 of FIG. 4) and may identify the detected electrical energy (current, voltage, or power).

In operation 630, when the magnitude of the identified energy falls within the first designated power, the control circuit (e.g., the control circuit 312 of FIG. 3 or the control circuit 412 of FIG. 4) may output the second designated power to the power receiver 502 using the power transmitting circuit 311. According to an embodiment, the first designated range may be a range in which the detected thermal energy is the same or smaller than a designated thermal energy threshold or in which the detected electrical energy is the same or smaller than a designated electrical energy threshold.

In operation 640, when the magnitude of the identified energy falls within the second designated power, the control circuit (e.g., the control circuit 312 of FIG. 3 or the control circuit 412 of FIG. 4) may be configured to stop outputting power to the power receiver 502 using the power transmitting circuit 311. According to an embodiment, the second designated range may be a range in which the detected thermal energy is larger than the designated thermal energy threshold or in which the detected electrical energy is larger than the designated electrical energy threshold. For example, the electrical energy may be at least one of current, voltage, or power.

According to an embodiment, a method for controlling wireless transmit power by detecting a foreign object by an electronic device (e.g., the electronic device 102 of FIG. 1, the power transmitter 301 of FIG. 3, or the power transmitter 501 of FIG. 5A) may comprise wirelessly outputting first designated power and second designated power through a transmitting coil (e.g., the transmitting coil 311L of FIG. 3 or the transmitting coil 411L of FIG. 4) to an external electronic device (e.g., the electronic device 101 of FIG. 1, the power receiver 302 of FIG. 3, or the power receiver 502 of FIG. 5A) using a power transmitting circuit (e.g., the power transmitting circuit 311 of FIG. 3 or the power transmitting circuit 411 of FIG. 4), identifying a variation in the magnitude of the first designated power and a variation in the magnitude of the second designated power detected at the coil or the power transmitting circuit due to the foreign object using a sensing circuit (e.g., the sensing circuit 314 of FIG. 3 or the current (or voltage) sensor 414 of FIG. 4), detecting the foreign object positioned adjacent to the electronic device based on at least one of the identified variation in the magnitude of the first designated power or the identified variation in the magnitude of the second designated power, and adjusting (or controlling) the power output to the external electronic device based on at least the detection of the foreign object.

According to an embodiment, the electronic device may be configured to output the first designated power in a first mode for performing communication for authenticating the external electronic device and the second designated power in a second mode for providing power to the external electronic device.

According to an embodiment, the foreign object may include a metallic material. Detecting the foreign object may include, when at least one of an identified magnitude of first power or an identified magnitude of second power falls within a third designated range in which the maximum value is smaller than the minimum value of a first designated range, detecting the foreign object positioned adjacent to the electronic device based on a first detection threshold related to detecting the metallic material, and when at least one of the identified magnitude of the first power or the identified magnitude of the second power falls within the first designated range, adjusting the first detection threshold to a second detection threshold smaller than the first detection threshold and detecting the foreign object positioned adjacent to the electronic device based on the adjusted second detection threshold.

According to an embodiment, the method may further comprise, when at least one of the identified magnitude of the first power or the identified magnitude of the second power falls within the second designated range in which the minimum value is larger than the maximum value of the first designated range, stopping outputting power to the external electronic device.

Figure 7:
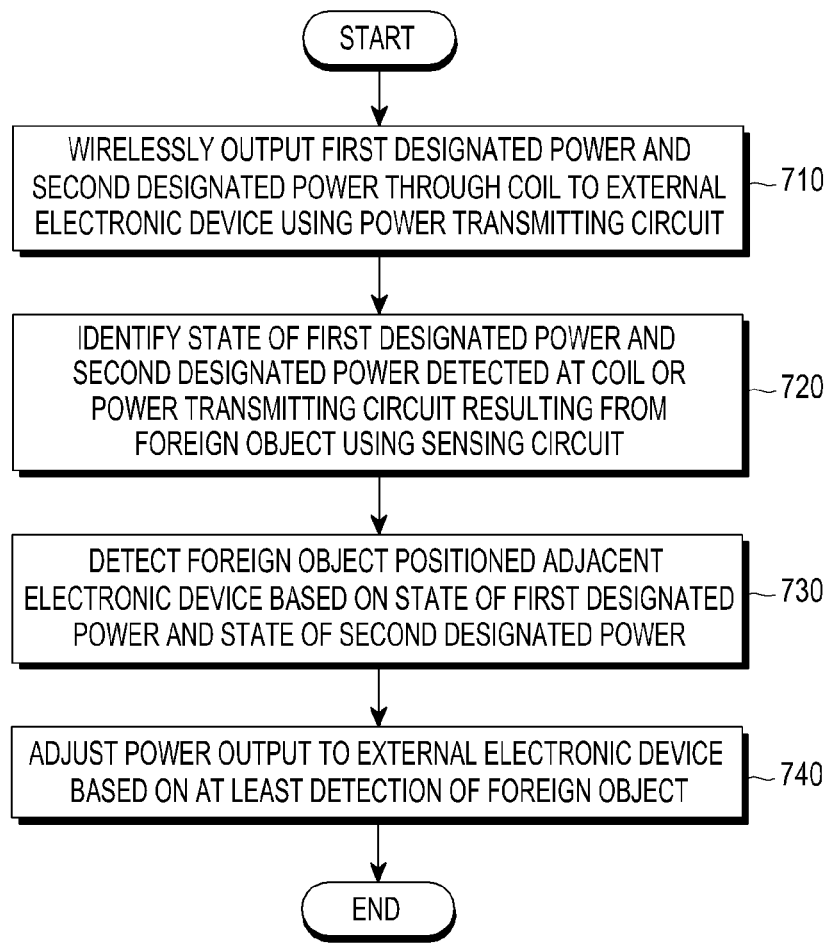
FIG. 7 is a view illustrating an operation in which an electronic device adjusts power output to an external electronic device based on FOD according to an embodiment.

FIG. 7 is a view illustrating an operation in which an electronic device adjusts power output to an external electronic device based on FOD according to an embodiment.

Referring to FIG. 7, according to an embodiment, in operation 710, a control circuit (e.g., the control circuit 312 of FIG. 3 or the control circuit 412 of FIG. 4) of an electronic device (e.g., the electronic device 102 of FIG. 1, the power transmitter 301 of FIG. 3, or the power transmitter 501 of FIG. 5A) may wirelessly output first designated power and second designated power to an external electronic device (e.g., the electronic device 101 of FIG. 1, the power receiver 302 of FIG. 3, or the power receiver 502 of FIG. 5A) through a transmitting coil (e.g., the transmitting coil 311L of FIG. 3 or the transmitting coil 411L of FIG. 4) using a power transmitting circuit (e.g., the power transmitting circuit 311 of FIG. 3 or the power transmitting circuit 411 of FIG. 4).

According to an embodiment, the electronic device (e.g., the electronic device 102 of FIG. 1, the power transmitter 301 of FIG. 3, or the power transmitter 501 of FIG. 5A) may output first designated power in a first mode (e.g., the identification/configuration phase) for authenticating the external electronic device (e.g., the electronic device 101 of FIG. 1, the power receiver 302 of FIG. 3, or the power receiver 502 of FIG. 5A) and second designated power in a second mode (e.g., the power transfer phase) for transmitting power to the power receiver (e.g., the electronic device 102 of FIG. 1, the power transmitter 301 of FIG. 3, or the power transmitter 501 of FIG. 5a).

According to an embodiment, the electronic device (e.g., the electronic device 102 of FIG. 1, the power transmitter 301 of FIG. 3, or the power transmitter 501 of FIG. 5A) may output the first designated power and the second designated power in a second mode (e.g., the power transfer phase) for transmitting power to an external electronic device (e.g., the electronic device 101 of FIG. 1 or the power receiver 302 of FIG. 3). In operation 720, the control circuit (e.g., the control circuit 312 of FIG. 3 or the control circuit 412 of FIG. 4) may identify the state of the first designated power and the state of the second designated power detected at the transmitting coil (e.g., the transmitting coil 311L of FIG. 3 or the transmitting coil 411L of FIG. 4) resulting from a foreign object by using the sensing circuit (e.g., the sensing circuit 314 of FIG. 3 or the current (or voltage) sensor 414 of FIG. 4).

According to an embodiment, the control circuit (e.g., the control circuit 312 of FIG. 3 or the control circuit 412 of FIG. 4) may identify the state of the first designated power output in a first mode (e.g., the identification/configuration phase) for performing communication for authenticating the external electronic device (e.g., the electronic device 101 of FIG. 1, the power receiver 302 of FIG. 3, or the power receiver 502 of FIG. 5A), which is a target for wireless charging by using the sensing circuit (e.g., the sensing circuit 314 of FIG. 3 or the current (or voltage) sensor 414 of FIG. 4) and identify the second designated power output in a second mode (e.g., the power transfer phase) for providing power to the external electronic device (e.g., the electronic device 101 of FIG. 1, the power receiver 302 of FIG. 3, or the power receiver 502 of FIG. 5A).

According to an embodiment, the control circuit (e.g., the control circuit 312 of FIG. 3 or the control circuit 412 of FIG. 4) may identify the state of the first designated power and the state of the second designated power in the second mode (e.g., the power transfer phase).

According to an embodiment, the foreign object may be a metallic material. The state value for the detected first designated power and second designated power may be the memory (e.g., power (W), current (A), or voltage (V) of the detected first power and second power). According to an embodiment, the magnitude of the first designated power and second designated power may be varied (e.g., increased) when there is a foreign object between the electronic device (e.g., the electronic device 102 of FIG. 1, the power transmitter 301 of FIG. 3, or the power transmitter 501 of FIG. 5A) and the external electronic device (e.g., the electronic device 101 of FIG. 1, the power receiver 302 of FIG. 3, or the power receiver 502 of FIG. 5A).

In operation 730, the control circuit (e.g., the control circuit 312 of FIG. 3 or the control circuit 412 of FIG. 4) may detect a foreign object positioned adjacent to the electronic device (e.g., the electronic device 102 of FIG. 1, the power transmitter 301 of FIG. 3, or the power transmitter 501 of FIG. 5A) based on the state value for the first designated power and the second designated power. For example, the state value for the first designated power may be obtained by detecting the first designated power through the sensing circuit and may be the magnitude of first power detected through the sensing circuit. The state value for the second designated power may be obtained by detecting the output second designated power through the sensing circuit and may be the memory of second power detected through the sensing circuit. According to an embodiment, the control circuit (e.g., the control circuit 312 of FIG. 3 or the control circuit 412 of FIG. 4) may detect the foreign object based on the magnitude of the detected first power and second power.

In operation 740, the control circuit (e.g., the control circuit 312 of FIG. 3 or the control circuit 412 of FIG. 4) may adjust the power output to the external electronic device (e.g., the electronic device 101 of FIG. 1, the power receiver 302 of FIG. 3, or the power receiver 502 of FIG. 5A) as a foreign object is detected. According to an embodiment, the control circuit (e.g., the processor 120 of FIG. 1, the control circuit 312 of FIG. 3 or the control circuit 412 of FIG. 4) may determine a state (e.g., the distance between the electronic device (e.g., the electronic device 102 of FIG. 1, the power transmitter 301 of FIG. 3, or the power transmitter 501 of FIG. 5A) and the foreign object) or the size or shape of the foreign object) detected based on the magnitude of the detected first power and the magnitude of the second designated power and may adjust the power output to the external electronic device (e.g., the electronic device 101 of FIG. 1, the power receiver 302 of FIG. 3, or the power receiver 502 of FIG. 5A) depending on the state of the foreign object.

According to an embodiment, when at least one of the magnitude of the first power or second power detected falls within a third designated range that is smaller in value than the first designated range, the control circuit (e.g., the control circuit 312 of FIG. 3 or the control circuit 412 of FIG. 4) may be configured to detect the foreign object based on a first detection threshold related to detecting a metallic material.

According to an embodiment, when at least one of the magnitude of the first power or the magnitude of the second power detected falls within a first designated range, the control circuit (e.g., the control circuit 312 of FIG. 3 or the control circuit 412 of FIG. 4) may be configured to adjust a first detection threshold related to detecting the metallic material to a second detection threshold smaller than the first detection threshold and to detect the foreign object based on the adjusted second detection threshold.

According to an embodiment, when at least one of the magnitude of the first power or second power detected falls within a second designated range larger in value than the first designated range, the control circuit (e.g., the control circuit 312 of FIG. 2 or the control circuit 412 of FIG. 4) may be configured to stop outputting power to the external electronic device (e.g., the electronic device 101 of FIG. 1, the power receiver 302 of FIG. 3, or the power receiver 502 of FIG. 5A).

Figure 8:
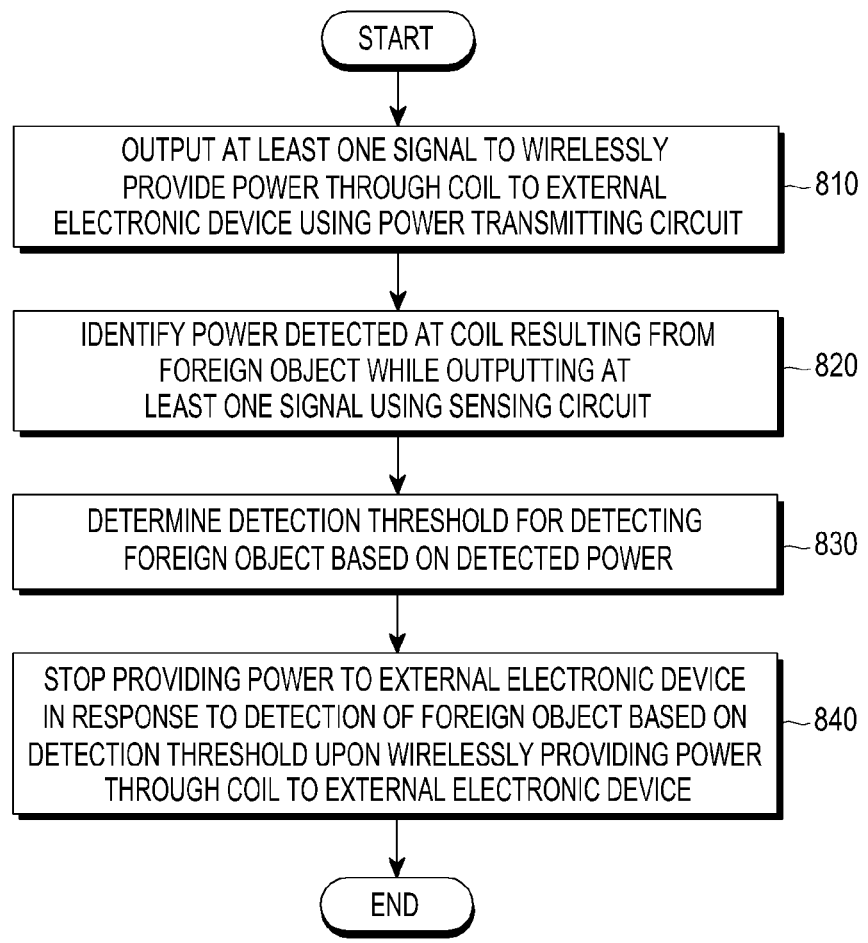
FIG. 8 is a view illustrating an operation in which an electronic device determines a threshold of FOD according to an embodiment.

FIG. 8 is a view illustrating an operation in which an electronic device determines a threshold of FOD according to an embodiment.

Referring to FIG. 8, according to an embodiment, in operation 810, a control circuit (e.g., the control circuit 312 of FIG. 3 or the control circuit 412 of FIG. 4) of an electronic device (e.g., the electronic device 102 of FIG. 1, the power transmitter 301 of FIG. 3, or the power transmitter 501 of FIG. 5A) may transmit or receive at least one signal to wirelessly provide power to an external electronic device (e.g., the electronic device 101 of FIG. 1, the power receiver 302 of FIG. 3, or the power receiver 502 of FIG. 5A) through a transmitting coil (e.g., the transmitting coil 311L of FIG. 3 or the transmitting coil 411L of FIG. 4) using a power transmitting circuit (e.g., the power transmitting circuit 311 of FIG. 3 or the power transmitting circuit 411 of FIG. 4).

According to an embodiment, the control circuit (e.g., the control circuit 312 of FIG. 3 or the control circuit 412 of FIG. 4) may identify at least one piece of electrical energy (e.g., current, voltage, or power) output through the transmitting coil (e.g., the transmitting coil 311L of FIG. 3 or the transmitting coil 411L of FIG. 4) while transmitting or receiving at least one signal corresponding to at least one state among the ping phase, the identification/configuration phase, and the power transfer phase through the transmitting coil (e.g., the transmitting coil 311L of FIG. 3 or the transmitting coil 411L of FIG. 4) using the power transmitting circuit (e.g., the power transmitting circuit 311 of FIG. 3 or the power transmitting circuit 411 of FIG. 4). For example, the at least one signal may be an SSP signal received from the external electronic device (e.g., the electronic device 101 of FIG. 1, the power receiver 302 of FIG. 3, or the power receiver 502 of FIG. 5A), and the second signal may be a CEP signal received in the transfer phase from the external electronic device (e.g., the electronic device 101 of FIG. 1, the power receiver 302 of FIG. 3, or the power receiver 502 of FIG. 5A).

In operation 820, the control circuit (e.g., the control circuit 312 of FIG. 3 or the control circuit 412 of FIG. 4) may identify power detected at the transmitting coil (e.g., the transmitting coil 311L of FIG. 3 or the transmitting coil 411L of FIG. 4) while transmitting or receiving the at least one signal by using the sensing circuit (e.g., the sensing circuit 314 of FIG. 3 or the current (or voltage) sensor 414 of FIG. 4).

According to an embodiment, the control circuit (e.g., the control circuit 312 of FIG. 3 or the control circuit 412 of FIG. 4) may identify the magnitude of first power detected in the identification/configuration phase after receiving the SSP signal in the ping phase. The control circuit (e.g., the control circuit 312 of FIG. 3 or the control circuit 412 of FIG. 4) may identify the magnitude of second power detected after receiving at least one or more CEP signals (e.g., after transmitting the fifth CEP signal and before receiving the sixth CEP signal) in the power transfer phase.

According to an embodiment, the control circuit (e.g., the control circuit 312 of FIG. 3 or the control circuit 412 of FIG. 4) may also identify the magnitude of power after transmitting at least one or more packets in the power transfer phase.

In operation 830, the control circuit (e.g., the control circuit 312 of FIG. 3 or the control circuit 412 of FIG. 4) may determine a detection threshold for detecting a foreign object based on the identified power. According to an embodiment, the control circuit (e.g., the control circuit 312 of FIG. 3 or the control circuit 412 of FIG. 4) may determine the detection threshold for detecting a foreign object based on the magnitude of the identified first power or based on the magnitude of the identified first power and the magnitude of the identified second power.

According to an embodiment, the control circuit (e.g., the control circuit 312 of FIG. 3 or the control circuit 412 of FIG. 4) may determine a detection threshold to determine a foreign object based on the magnitude of the identified first power as set forth in Table 1 below.

TABLE 1

| Magnitude of first power | FOD sensitivity | Detection threshold |
|---|---|---|
| First designated power range (magnitude of first power < ping foreign object detection (PFOD) 1st threshold) | Normal | First detection threshold (FOD threshold A) |
| Second designated power range (PFOD 1st threshold < magnitude of first power < PFOD 2nd threshold) | High | Second detection threshold |
| Third designated power range (PFOD 2nd threshold < magnitude of first power) | stop power supplying | (FOD threshold B) |

Referring to Table 1, according to an embodiment, when the magnitude of the first power falls within a first designated power range (the magnitude of the first power<PFOD 1st threshold), the control circuit (e.g., the control circuit 312 of FIG. 3 or the control circuit 412 of FIG. 4) may determine that the detection threshold for detecting a foreign object is a first detection threshold (FOD threshold A) corresponding to the FOD sensitivity being normal. When the identified magnitude of the first power falls within a second designated power range (PFOD 1st threshold<the magnitude of the first power<PFOD 2nd threshold) larger than the first designated power range, the control circuit may determine that the detection threshold for detecting a foreign object is a second detection threshold (FOD threshold B) that is smaller than the first detection threshold and that corresponds to the FOD sensitivity being high.

According to an embodiment, when the identified magnitude of the first power falls within a third designated power range (PFOD 2nd threshold<the magnitude of the first power) larger than the second designated power range, the control circuit (e.g., the control circuit 312 of FIG. 3 or the control circuit 412 of FIG. 4) may perform a control to stop providing power to an external electronic device (e.g., the electronic device 101 of FIG. 1, the power receiver 302 of FIG. 3, or the power receiver 502 of FIG. 5A) without determining any detection threshold.

According to an embodiment, the control circuit (e.g., the control circuit 312 of FIG. 3 or the control circuit 412 of FIG. 4) may determine a detection threshold to determine a foreign object based on the magnitude of the first power and the magnitude of the second power identified as set forth in Table 2 below.

TABLE 2

| Magnitude of first power | Magnitude of second power | FOD sensitivity | Detection threshold |
|---|---|---|---|
| First designated power range (magnitude of first power < PFOD 1st threshold) | Don't care | Normal | First detection threshold (FOD threshold A) |

TABLE 2-continued

| Magnitude of first power | Magnitude of second power | FOD sensitivity | Detection threshold |
|---|---|---|---|
| Second designated power range (PFOD 1st threshold < magnitude of first power < PFOD 2nd threshold) | First designated power range (magnitude of second power < PFOD 1st threshold) | Normal | First detection threshold (FOD threshold A) |
| Second designated power range (PFOD 1st threshold < magnitude of first power < PFOD 2nd threshold) | Second designated power range (PFOD 1st threshold < magnitude of second power < PFOD 2nd threshold) | High | Second detection threshold (FOD threshold B) |
| Second designated power range (PFOD 1st threshold < magnitude of first power < PFOD 2nd threshold) | Third designated power range (PFOD 2nd threshold < magnitude of second power) | High | Second detection threshold (FOD threshold B) |
| Third designated power range (PFOD 2nd threshold < magnitude of first power) | First designated power range (magnitude of second power < PFOD 1st threshold) | Normal | First detection threshold (FOD threshold A) |
| Third designated power range (PFOD 2nd threshold < magnitude of first power) | Second designated power range (PFOD 1st threshold < magnitude of second power < PFOD 2nd threshold) | High | Second detection threshold (FOD threshold B) |
| Third designated power range (PFOD 2nd threshold < magnitude of first power) | Third designated power range (PFOD 2nd threshold < magnitude of second power) | stop power supplying | |

Referring to Table 2, according to an embodiment, when the identified magnitude of the first power falls within a first designated power range (the magnitude of the first power<PFOD 1st threshold), the control circuit (e.g., the control circuit 312 of FIG. 3 or the control circuit 412 of FIG. 4) may determine that the detection threshold for detecting a foreign object is a first detection threshold (FOD threshold A) corresponding to the FOD sensitivity being normal.

According to an embodiment, when the identified magnitude of the first power falls within a second designated power range (PFOD 1st threshold<the magnitude of the first power<PFOD 2nd threshold), and the identified magnitude of the second power falls within a first designated power range (the magnitude of the second power<PFOD 1st threshold), the control circuit (e.g., the control circuit 312 of FIG. 3 or the control circuit 412 of FIG. 4) may determine that the detection threshold for detecting a foreign object is a first detection threshold (FOD threshold A) corresponding to the FOD sensitivity being normal.

According to an embodiment, when the identified magnitude of the first power falls within a second designated power range (PFOD 1st threshold<the magnitude of the first power<PFOD 2nd threshold), and the identified magnitude of the second power falls within the second designated power range (PFOD 1 st threshold<the magnitude of the second power<PFOD 2nd threshold), the control circuit (e.g., the control circuit 312 of FIG. 3 or the control circuit 412 of FIG. 4) may determine that the detection threshold for detecting a foreign object is a second detection threshold (FOD threshold B) corresponding to the FOD sensitivity being high.

According to an embodiment, when the identified magnitude of the first power falls within the second designated power range (PFOD 1st threshold<the magnitude of the first power<PFOD 2nd threshold), and the identified magnitude of the second power falls within a third designated power range (PFOD 2nd threshold<the magnitude of the second power), the control circuit (e.g., the control circuit 312 of FIG. 3 or the control circuit 412 of FIG. 4) may determine that the detection threshold for detecting a foreign object is the second detection threshold (FOD threshold B) corresponding to the FOD sensitivity being high.

According to an embodiment, when the identified magnitude of the first power falls within the third designated power range (PFOD 2nd threshold<the magnitude of the first power), and the identified magnitude of the second power falls within the first designated power range (the magnitude of the second power<PFOD 1st threshold), the control circuit (e.g., the control circuit 312 of FIG. 3 or the control circuit 412 of FIG. 4) may determine that the detection threshold for detecting a foreign object is the first detection threshold (FOD threshold A) corresponding to the FOD sensitivity being normal.

According to an embodiment, when the identified magnitude of the first power falls within the third designated power range (PFOD 2nd threshold<the magnitude of the first power), and the identified magnitude of the second power falls within the second designated power range (PFOD 1st threshold<the magnitude of the second power<PFOD 2nd threshold), the control circuit (e.g., the control circuit 312 of FIG. 3 or the control circuit 412 of FIG. 4) may determine that the detection threshold for detecting a foreign object is the second detection threshold (FOD threshold B) corresponding to the FOD sensitivity being high.

According to an embodiment, when the identified magnitude of the first power falls within the third designated power range (PFOD 2nd threshold<the magnitude of the first power), and the identified magnitude of the second power falls within the third designated power range (PFOD 2nd threshold<the magnitude of the second power), the control circuit (e.g., the control circuit 312 of FIG. 3 or the control circuit 412 of FIG. 4) may perform a control to stop providing power to the external electronic device (e.g., the electronic device 101 of FIG. 1, the power receiver 302 of FIG. 3, or the power receiver 502 of FIG. 5A) without determining any detection threshold.

In operation 840, upon detecting a foreign object based on the determined detection threshold while wirelessly providing power to the external electronic device (e.g., the electronic device 101 of FIG. 1, the power receiver 302 of FIG. 3, or the power receiver 502 of FIG. 5A) through the transmitting coil (e.g., the transmitting coil 311L of FIG. 3 or the transmitting coil 411L of FIG. 4), the control circuit (e.g., the control circuit 312 of FIG. 3 or the control circuit 412 of FIG. 4) may stop providing power to the external electronic device (e.g., the electronic device 101 of FIG. 1, the power receiver 302 of FIG. 3, or the power receiver 502 of FIG. 5A).

According to an embodiment, when the difference in magnitude between the power provided to the external electronic device (e.g., the electronic device 101 of FIG. 1, the power receiver 302 of FIG. 3, or the power receiver 502 of FIG. 5A) and the power received by the power receiver 302 exceeds the determined detection threshold, the control circuit (e.g., the control circuit 312 of FIG. 3 or the control circuit 412 of FIG. 4) may determine that there is a foreign object, detect the foreign object, and perform a control to stop providing the power to the external electronic device (e.g., the electronic device 101 of FIG. 1, the power receiver 302 of FIG. 3, or the power receiver 502 of FIG. 5A).

Figure 9:
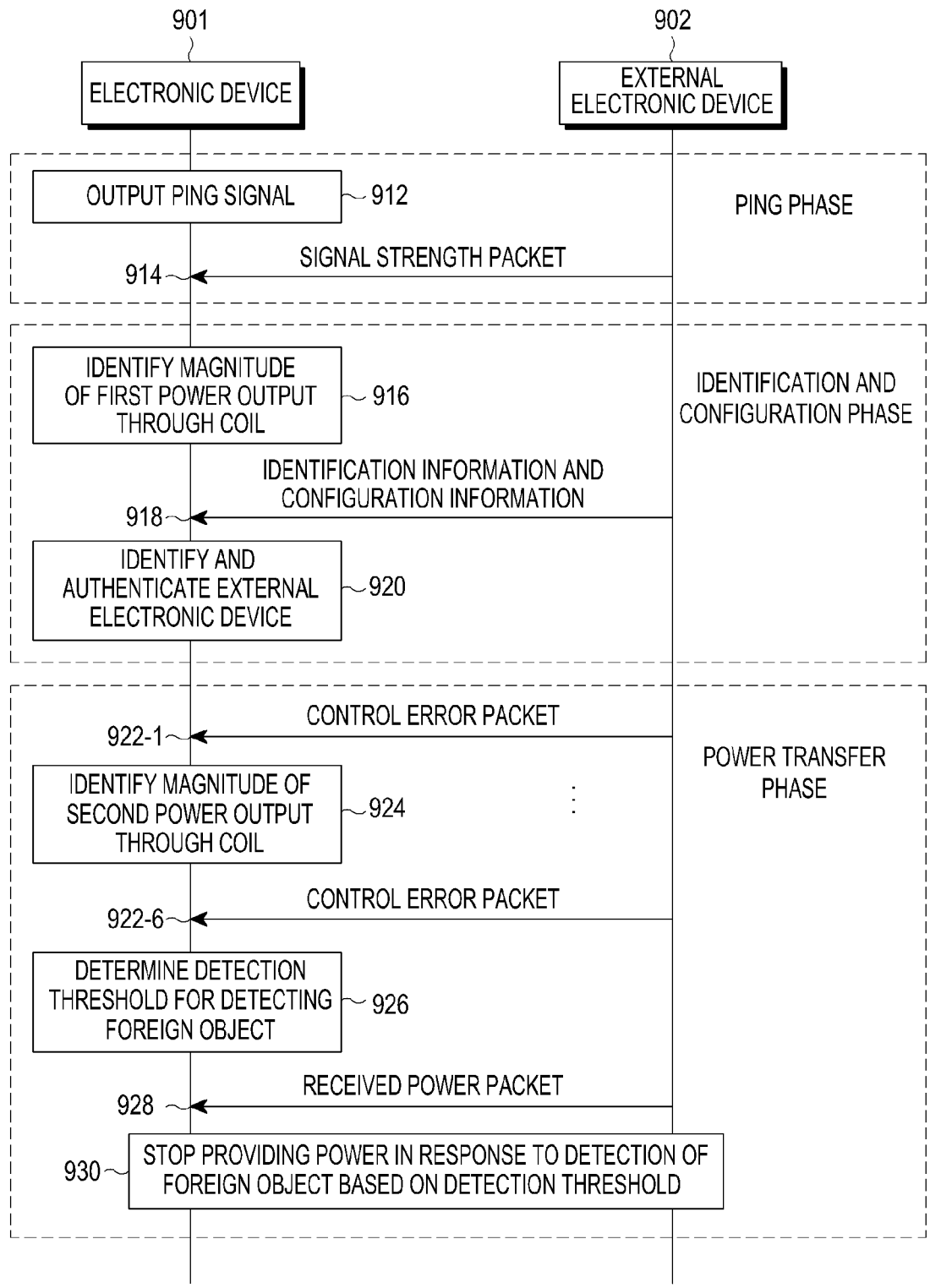
FIG. 9 is a view illustrating a wireless charging operation between an electronic device and an external electronic device according to an embodiment.

FIG. 9 is a view illustrating a wireless charging operation between an electronic device and an external electronic device according to an embodiment.

Referring to FIG. 9, in operation 912, according to an embodiment, the electronic device 901 (e.g., the electronic device 102 of FIG. 1, the power transmitter 301 of FIG. 3, or the power transmitter 501 of FIG. 5A) may transmit a ping signal to detect a target for power reception, i.e., the external electronic device 902 (e.g., the electronic device 101 of FIG. 1, the power receiver 302 of FIG. 3, or the power receiver 502 of FIG. 5A).

In operation 914, as the external electronic device 902 receives the ping signal, the electronic device 901 may receive an SSP signal from the external electronic device 902.

In operation 916, the electronic device 901, after receiving the SSP signal, may identify the magnitude of first power output through a transmitting coil (e.g., the transmitting coil 311L of FIG. 3 or the transmitting coil 411L of FIG. 4) by using a sensing circuit (e.g., the sensing circuit 314 of FIG. 3 or the current (voltage) sensor 414 of FIG. 4).

In operation 918, the electronic device 901 may receive identification/configuration information from the external electronic device 902. In operation 920, the electronic device 901 may identify and authenticate the external electronic device 902.

In operations 922-1 and 922-6, the electronic device 901 may receive at least one or more CEP signals from the external electronic device 902.

In operation 924, while receiving at least one or more CEP signals, the electronic device 901 may identify the magnitude of second power output through the transmitting coil (e.g., the transmitting coil 311L of FIG. 3 or the transmitting coil 411L of FIG. 4) by using the sensing circuit (e.g., the sensing circuit 314 of FIG. 3 or the current (voltage) sensor 414 of FIG. 4). For example, after receiving a plurality of CEP signals and, e.g., at a time between the reception of the fifth CEP signal and the reception of the sixth CEP signal), the electronic device 901 may identify the magnitude of the second power output through the transmitting coil (e.g., the transmitting coil 311L of FIG. 3 or the transmitting coil 411L of FIG. 4) by using the sensing circuit (e.g., the sensing circuit 314 of FIG. 3 or the current (voltage) sensor 414 of FIG. 4).

According to an embodiment, the electronic device 901 may identify the magnitude of the second power at a predetermined time interval after measuring the first power through the sensing circuit.

For example, the electronic device 901 may identify the magnitude of the first power measured at the time of the reception of the SSP signal from the external electronic device 902 and may identify the second power measured at a predetermined time interval thereafter. For example, the electronic device 901 may determine whether the predetermined time arrives after receiving the SSP signal by way of a timer and may measure the second power at that time.

In operation 926, the electronic device 901 may determine a detection threshold for detecting a foreign object (e.g., a metallic material) that might be present between the electronic device 901 and the external electronic device 902. According to an embodiment, the electronic device 901 may determine the detection threshold for detecting a foreign object based on the magnitude of the first power or based on the magnitude of the first power and the magnitude of the second power.

According to an embodiment, in the case where the electronic device 901 determines the detection threshold for detecting a foreign object based on the magnitude of the first power, when the magnitude of the first power falls within a first designated power range (the magnitude of the first power<PFOD 1st threshold), the electronic device 901 may determine that the detection threshold for detecting a foreign object is a first detection threshold (FOD threshold A) corresponding to the FOD sensitivity being normal, and when the identified magnitude of the first power falls within a second designated power range (PFOD 1st threshold<the magnitude of the first power<PFOD 2nd threshold) larger than the first designated power range<the electronic device 901 may determine that the detection threshold for detecting a foreign object is a second detection threshold (FOD threshold B) corresponding to the FOD sensitivity being high.

According to an embodiment, in the case where the electronic device 901 determines the detection threshold for determining a foreign object based on the magnitude of the first power and the magnitude of the second power, when the magnitude of the first power falls within the first designated power range (the magnitude of the first power<PFOD 1st threshold), the electronic device 901 may determine that the detection threshold for determining a foreign object is the first detection threshold (FOD threshold A) corresponding to the FOD sensitivity being normal, when the magnitude of the first power falls within the second designated power range (PFOD 1st threshold<the magnitude of the first power<PFOD 2nd threshold), and the identified magnitude of the second power falls within the first designated power range (the magnitude of the second power<PFOD 1st threshold), the electronic device 901 may determine that the detection threshold for determining a foreign object is the first detection threshold (FOD threshold A) corresponding to the FOD sensitivity being normal, when the magnitude of the first power falls within the second designated power range (PFOD 1st threshold<the magnitude of the first power<PFOD 2nd threshold), and the identified magnitude of the second power falls within the second designated power range (PFOD 1st threshold<the magnitude of the second power<PFOD 2nd threshold), the electronic device 901 may determine that the detection threshold for determining a foreign object is the second detection threshold (FOD threshold B) corresponding to the FOD sensitivity being high, when the magnitude of the first power falls within the second designated power range (PFOD 1st threshold<the magnitude of the first power<PFOD 2nd threshold), and the identified magnitude of the second power falls within a third designated power range (PFOD 2nd threshold<the magnitude of the second power), the electronic device 901 may determine that the detection threshold for determining a foreign object is the second detection threshold (FOD threshold B) corresponding to the FOD sensitivity being high, when the magnitude of the first power falls within the third designated power range (PFOD 2nd threshold<the magnitude of the first power), and the identified magnitude of the second power falls within the first designated power range (the magnitude of the second power<PFOD 1st threshold), the electronic device 901 may determine that the detection threshold for determining a foreign object is the first detection threshold (FOD threshold A) corresponding to the FOD sensitivity being normal, and when the magnitude of the first power falls within the third designated power range (PFOD 2nd threshold<the magnitude of the first power), and the identified magnitude of the second power falls within the second designated power range (PFOD 1 st threshold<the magnitude of the second power<PFOD 2nd threshold), the electronic device 901 may determine that the detection threshold for determining a foreign object is the second detection threshold (FOD threshold B) corresponding to the FOD sensitivity being high.

According to an embodiment, when the magnitude of the first power falls within the third designated power range (PFOD 2nd threshold<the magnitude of the first power) larger than the second designated power range, the electronic device 901 may perform a control to stop providing power to the external electronic device (e.g., the electronic device 101 of FIG. 1, the power receiver 302 of FIG. 3, or the power receiver 502 of FIG. 5A) without determining any detection threshold, or when the magnitude of the first power falls within the third designated power range (PFOD 2nd threshold<the magnitude of the first power), and the identified magnitude of the second power falls within the third designated power range (PFOD 2nd threshold<the magnitude of the second power), the electronic device 901 may perform a control to stop providing power to the external electronic device (e.g., the electronic device 101 of FIG. 1, the power receiver 302 of FIG. 3, or the power receiver 502 of FIG. 5A) without determining any detection threshold.

In operation 928, the electronic device 901 may receive an RPP signal from the external electronic device 902. For example, the RPP signal may contain magnitude information about the power received by the external electronic device.

In operation 930, the electronic device 901 may detect a foreign object based on the determined detection threshold and may thus stop providing power to the external electronic device (e.g., the electronic device 101 of FIG. 1, the power receiver 302 of FIG. 3, or the power receiver 502 of FIG. 5A).

According to an embodiment, when the difference in magnitude between the power of the signal provided to the external electronic device 902 and the power received by the power receiver 302 exceeds the determined detection threshold, the electronic device 901 may determine that a foreign object is present and stop providing power to the external electronic device 902.

For example, when the difference in magnitude between the power of the CEP signal provided to the external electronic device 902 or another power-related signal and the power received by the power receiver 302 which is obtained through the RPP signal exceeds the determined detection threshold, the electronic device 901 may determine that a foreign object is present and stop providing power to the external electronic device 902.

Figure 10:
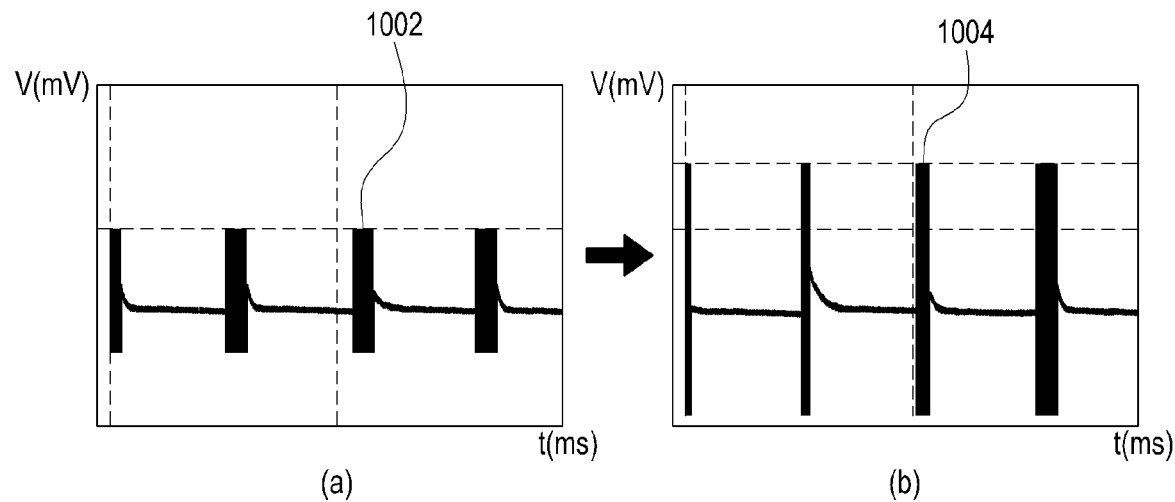
FIG. 10 is a view illustrating electric energy upon transmitting a ping signal according to an embodiment.

FIG. 10 is a view illustrating electrical energy upon transmitting a ping signal according to an embodiment.

Referring to FIG. 10, according to an embodiment, an electronic device (e.g., the electronic device 102 of FIG. 1, the power transmitter 301 of FIG. 3, the power transmitter 501 of FIG. 5A, or the electronic device 901 of FIG. 9) may identify electrical energy (current, voltage, or power) 1002 or 1004 output through a transmitting coil (e.g., the transmitting coil 311L of FIG. 3 or the transmitting coil 411L of FIG. 4) while transmitting a ping signal using a sensing circuit (e.g., the sensing circuit 314 of FIG. 3 or the current (voltage) sensor 414 of FIG. 4). FIG. 10(a) may show electrical energy (current, voltage, or power) 1002 output through the transmitting coil where there is no metallic material between the electronic device and the external electronic device, and FIG. 10(b) may show electrical energy (current, voltage, or power) 1004 output through the transmitting coil where there is metallic material between the electronic device and the external electronic device. It may be verified that the electrical energy (current, voltage, or power) 1002 output through the transmitting coil where no metallic material is present as shown in FIG. 10(a) is larger than the electrical energy (current, voltage, or power) 1004 output through the transmitting coil where there is a metallic material between the electronic device and the external electronic device as shown in FIG. 10(b). According to an embodiment, the electronic device (e.g., the electronic device 102 of FIG. 1, the power transmitter 301 of FIG. 3, the power transmitter 501 of FIG. 5A, or the electronic device 901 of FIG. 9) may identify the magnitude of the electrical energy (current, voltage, or power) output through the transmitting coil (e.g., the transmitting coil 311L of FIG. 3 or the transmitting coil 411L of FIG. 4) while transmitting a ping signal and may detect the presence or absence of a metallic material between the electronic device and the external electronic device.

Figure 11A:
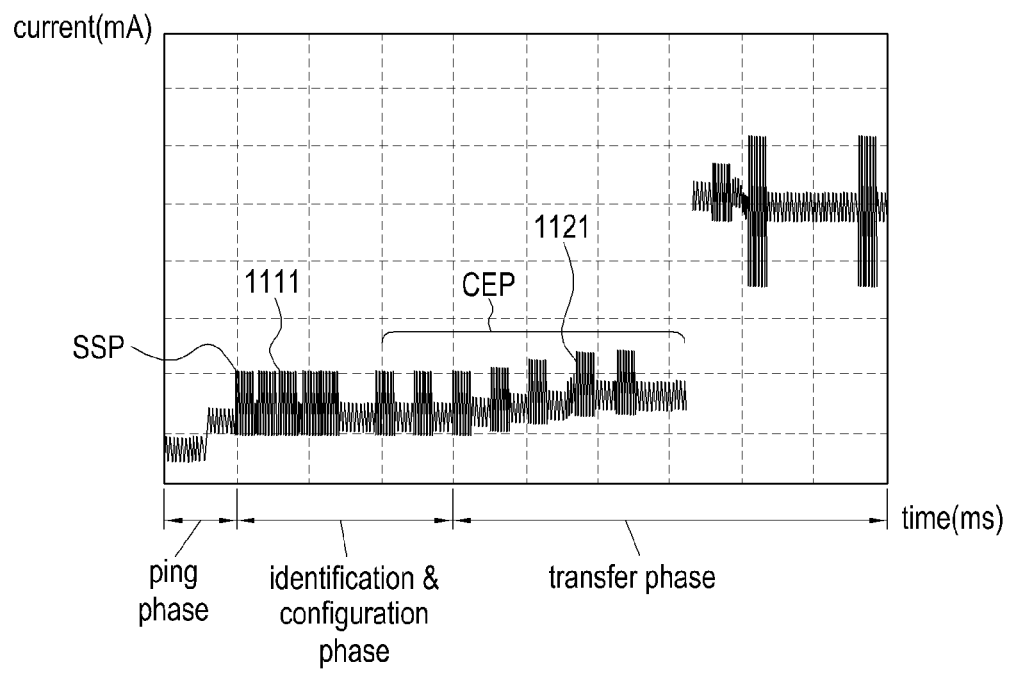
FIGS. 11A to 11C are views illustrating an example of electric energy detected upon wirelessly transmitting power by an electronic device according to an embodiment.
Figure 11B:
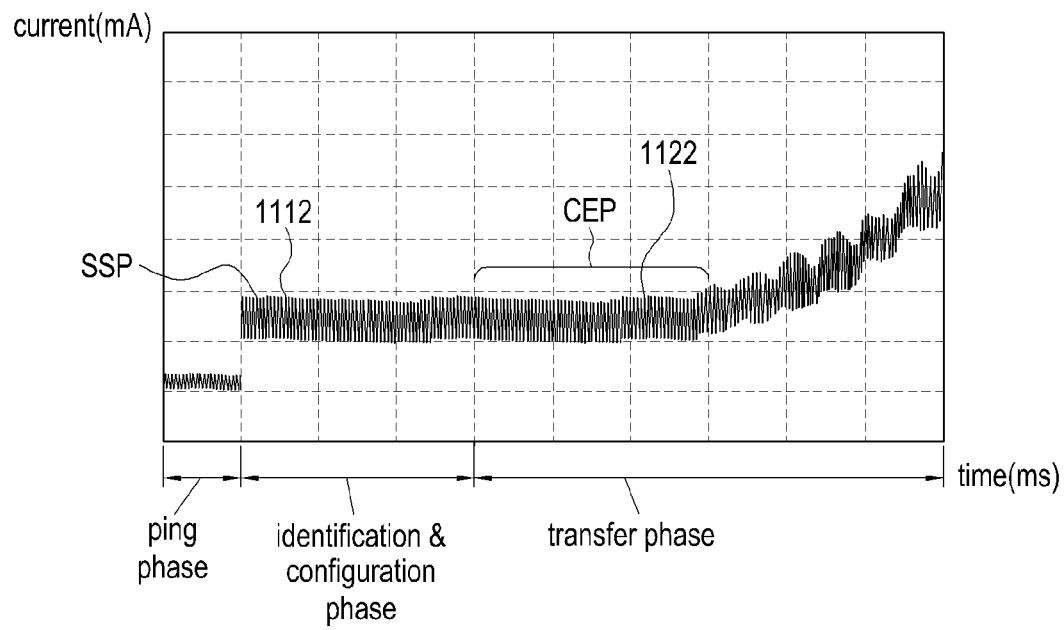
Figure 11C:
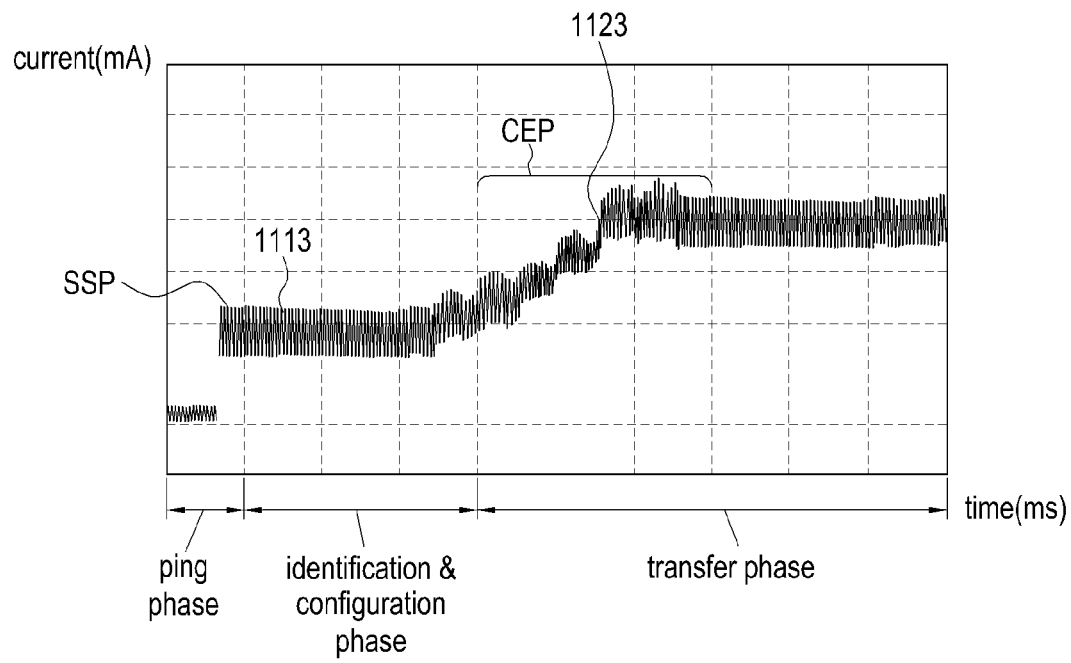

FIGS. 11A to 11C are views illustrating an example of electrical energy detected upon wirelessly transmitting power by an electronic device according to an embodiment.

Referring to FIGS. 11A to 11C, according to an embodiment, an electronic device (e.g., the electronic device 102 of FIG. 1, the power transmitter 301 of FIG. 3, the power transmitter 501 of FIG. 5A, or the electronic device 901 of FIG. 9) may identify at least one piece of electrical energy (current, voltage, or power) output through a transmitting coil (e.g., the transmitting coil 311L of FIG. 3 or the transmitting coil 411L of FIG. 4) while transmitting or receiving at least one signal corresponding to at least one state among a ping phase, an identification/configuration phase, or a power transfer phrase using a sensing circuit (e.g., the sensing circuit 314 of FIG. 3 or the current (voltage) sensor 414 of FIG. 4).

According to an embodiment, the electronic device (e.g., the electronic device 102 of FIG. 1, the power transmitter 301 of FIG. 3, the power transmitter 501 of FIG. 5A, or the electronic device 901 of FIG. 9) may identify first electrical energy (current, voltage, or power) 1111 to 1113 output through the transmitting coil (e.g., the transmitting coil 311L of FIG. 3 or the transmitting coil 411L of FIG. 4) after receiving a first signal (e.g., an SSP signal in the ping phase) by using the sensing circuit (e.g., the sensing circuit 314 of FIG. 3 or the current (voltage) sensor 414 of FIG. 4) and second electrical energy (current, voltage, or power) 1121 to 1123 output through the transmitting coil (e.g., the transmitting coil 311L of FIG. 3 or the transmitting coil 411L of FIG. 4) after receiving a second signal (e.g., a CEP signal in the power transfer phrase), e.g., at a time between the reception of the fifth CEP signal and the reception of the sixth CEP signal).

FIG. 11A illustrates an example of the first electrical energy (current, voltage, or power) 1111 and an example of the second electrical energy (current, voltage, or power) 1121 identified where there is no metallic material between the electronic device and the external electronic device. FIG. 11B illustrates an example of the first electrical energy (current, voltage, or power) 1112 and an example of the second electrical energy (current, voltage, or power) 1122 identified where there is a metallic material (e.g., a dime) of a first size between the electronic device and the external electronic device. FIG. 11C illustrates an example of the first electrical energy (current, voltage, or power) 1113 and an example of the second electrical energy (e.g., current, voltage, or power) 1123 identified where there is a metallic material (e.g., a quarter) of a second size between the electronic device and the external electronic device.

According to an embodiment, the electronic device (e.g., the electronic device 102 of FIG. 1, the power transmitter 301 of FIG. 3, the power transmitter 501 of FIG. 5A, or the electronic device 901 of FIG. 9) may determine the detection threshold based on the identified first electrical energy 1111 to 1113 and second electrical energy 1121 to 1123 and may detect the presence or absence of a metallic material between the electronic device and the external electronic device.

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

According to an embodiment, there may be provided a storage medium storing instructions configured to, when executed by at least one circuit, enable the at least one circuit to perform at least one operation that may comprise wirelessly outputting first designated power and second designated power through a coil to an external electronic device using a power transmitting circuit, identifying a variation in a magnitude of the first designated power and a variation in a magnitude of the second designated power detected at the coil or the power transmitting circuit due to the foreign object using a sensing circuit, detecting the foreign object positioned adjacent to the electronic device based on at least one of the identified variation in the magnitude of the first designated power or the identified variation in the magnitude of the second designated power, and adjusting (or controlling) the power output to the external electronic device based on at least the detection of the foreign object.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

As is apparent from the foregoing description, according to an embodiment, a foreign object may be detected in a signal transmission/reception phase for wireless charging, so that wireless transmit power may be controlled by detecting a foreign object before power is actually transmitted to an external electronic device.

According to an embodiment, the sensitivity of FOD may be adjusted by determining a threshold for stopping power transmission to an external electronic device based on energy caused by a foreign object before power is actually transmitted to the external electronic device.

According to various embodiments, an electronic device may determine a detection threshold (FOD threshold) for detecting a foreign object based on at least one piece of energy detected in a ping phase, an identification/configuration phase, or a power transfer phase to detect an external electronic device, a target for wireless charging, and to control transmit power. The electronic device may set the detection threshold (FOD threshold) for stopping the supply of power due to a foreign object to increase when the detected energy is small or may set the detection threshold (FOD threshold) for stopping the supply of power due to a foreign object to decrease when the energy is small due to a foreign object. As such, the electronic device may flexibly stop the supply of power.

It is apparent to one of ordinary skill in the art that the camera modules according to various embodiments of the disclosure as described above are not limited to the above-described embodiments and those shown in the drawings, and various changes, modifications, or alterations may be made thereto without departing from the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a coil;
a power transmitting circuit electrically connected with the coil;
a sensing circuit; and
a control circuit, wherein the control circuit is configured to:
wirelessly output, using the power transmitting circuit, a first designated power through the coil,
identify, using the sensing circuit, first energy from the first designated power detected at the coil due to a foreign object of the electronic device,
when a magnitude of the first energy falls within a first designated range, output, using the power transmitting circuit, a second designated power through the coil, and
when the magnitude of the first energy falls within a second designated range, abstain from outputting any power using the power transmitting circuit.

2. The electronic device of claim 1, wherein the control circuit is configured to output a third designated power through the coil using the power transmitting circuit before outputting the first designated power.

3. The electronic device of claim 2, wherein the control circuit is configured to output the third designated power a same magnitude as a magnitude of the first designated power.

4. The electronic device of claim 2, wherein the control circuit is configured to identify second energy from the third designated power detected at the coil using the sensing circuit.

5. The electronic device of claim 4, wherein:
the foreign object includes a metallic material, and
when at least one of the magnitude of the first energy or a magnitude of the second energy falls within a third designated range in which a maximum value is smaller than a minimum value of the first designated range, the control circuit is configured to output the second designated power while maintaining a first detection threshold related to detecting the metallic material.

6. The electronic device of claim 4, wherein:
the foreign object includes a metallic material, and
the control circuit is configured to, when the magnitude of the first energy and a magnitude of the second energy fall within the first designated range:
adjust a first detection threshold related to detecting the metallic material to a second detection threshold smaller than the first detection threshold, and
output the second designated power according to the second detection threshold.

7. The electronic device of claim 4, wherein when the magnitude of the first energy and a magnitude of the second energy fall within the second designated range, the control circuit is configured to stop outputting any power.

8. The electronic device of claim 1, wherein the control circuit is further configured to:
wirelessly output, using the power transmitting circuit, a first designated power and a second designated power through the coil,
identify, using the sensing circuit, a state of the first designated power and a state of the second designated power detected at the coil or the power transmitting circuit due to a foreign object,
detect the foreign object positioned adjacent to the electronic device based on the identified state of the first designated power and the identified state of the second designated power, and
adjust the first designated power and the second designated power output through the coil based on at least the detection of the foreign object.

9. The electronic device of claim 8, wherein the control circuit is configured to:
output the first designated power in a first mode for performing communication for authenticating an external electronic device, and
output the second designated power in a second mode for providing the second designated power to the external electronic device.

10. The electronic device of claim 9, wherein:
the foreign object includes a metallic material, and
when at least one of the identified state of the first designated power or the identified state of the second designated power falls within a third designated range in which a maximum value is smaller than a minimum value of a first designated range, the control circuit is configured to detect the foreign object based on a first detection threshold related to detecting the metallic material.

11. The electronic device of claim 9, wherein:
the foreign object includes a metallic material, and
when at least one of an identified magnitude of the first designated power or an identified magnitude of the second designated power falls within a first designated range, the control circuit is configured to:
adjust a first detection threshold related to detecting the metallic material to a second detection threshold smaller than the first detection threshold, and
detect the foreign object based on the second detection threshold.

12. The electronic device of claim 9, wherein when at least one of an identified magnitude of first power or an identified magnitude of second power falls within a second designated range in which a minimum value is larger than a maximum value of a first designated range, the control circuit is configured to stop outputting any power to the external electronic device.

13. A method for controlling wireless transmit power by detecting a foreign object by an electronic device, the method comprising:
wirelessly outputting a power, using a power transmitting circuit, the power including a first designated power through a coil in a first mode for performing communication for authenticating an external electronic device and a second designated power through the coil in a second mode for charging the external electronic device;
identifying, using a sensing circuit, a variation in a magnitude of the first designated power and a variation in a magnitude of the second designated power detected at the coil or the power transmitting circuit due to the foreign object;

detecting the foreign object positioned adjacent to the electronic device based on at least one of the identified variation in the magnitude of the first designated power or the identified variation in the magnitude of the second designated power; and adjusting power output through the coil based on at least the detection of the foreign object.

14. The method of claim 13, wherein the foreign object includes a metallic material, and wherein detecting the foreign object includes:

when at least one of an identified magnitude of the first designated power or an identified magnitude of the second designated power falls within a third designated range in which a maximum value is smaller than a minimum value of a first designated range, detecting the foreign object positioned adjacent the electronic device based on a first detection threshold related to detecting the metallic material, and when at least one of the identified magnitude of the first designated power or the identified magnitude of the second designated power falls within the first designated range, adjusting the first detection threshold to a second detection threshold smaller than the first detection threshold, and detecting the foreign object positioned adjacent the electronic device based on the second detection threshold.

15. The method of claim 14, further comprising, when at least one of the identified magnitude of the first designated power or the identified magnitude of the second designated power falls within a second designated range in which the minimum value is larger than the maximum value of the first designated range, stopping output of any power.

16. An electronic device, comprising:
a coil;
a power transmitting circuit electrically connected with the coil;
a sensing circuit; and
a control circuit, wherein the control circuit is configured to:
output, using the power transmitting circuit, a signal to wirelessly provide power through the coil,
identify, using the sensing circuit, power detected at the coil while outputting the signal,
determine a detection threshold for detecting a foreign object based on a magnitude of the detected power, and
stop providing the power upon detecting the foreign object based on the determined detection threshold when wirelessly providing the power through the coil.

17. The electronic device of claim 16, wherein when a difference in magnitude between the power of the signal provided to an external electronic device and a power received by the external electronic device exceeds the determined detection threshold, the control circuit is configured to determine that the foreign object is detected.

18. The electronic device of claim 16, wherein the power includes at least one of a first power identified in a first mode for performing communication for authenticating an external electronic device which is a target for wireless charging or a second power identified in a second mode for providing the power to the external electronic device.

19. The electronic device of claim 16, wherein the control circuit is configured to:
when a magnitude of the identified power falls within a first designated power range, determine that a threshold for detecting the foreign object is a first detection threshold,
when the magnitude of the identified power falls within a second designated power range in which a minimum value is larger than a maximum value of the first designated power range, determine that the threshold for detecting the foreign object is a second detection threshold larger than the first detection threshold, and
when the magnitude of the identified power falls within a third designated power range in which the minimum value is larger than the maximum value of the second designated power range, stop providing the power.

* * * * *

UNITED STATES PATENT AND TRADEMARK OFFICE
CERTIFICATE OF CORRECTION

PATENT NO. : 10,673,285 B2  
APPLICATION NO. : 16/283182  
DATED : June 2, 2020  
INVENTOR(S) : Mincheol Ha et al.

Page 1 of 1

It is certified that error appears in the above-identified patent and that said Letters Patent is hereby corrected as shown below:

On the Title Page

Column 1, between items (65) and (51), item (30) should be inserted and should read:  
--(30) Foreign Application Priority Data  
February 23, 2018 (KR) ...................... 10-2018-0021907--.

Signed and Sealed this  
Fourteenth Day of July, 2020

Andrei Iancu  
*Director of the United States Patent and Trademark Office*